(12) United States Patent
Iwasa

(10) Patent No.: US 12,343,640 B2
(45) Date of Patent: Jul. 1, 2025

(54) COMPUTER-READABLE NON-TRANSITORY STORAGE MEDIUM HAVING GAME PROGRAM STORED THEREIN, GAME APPARATUS, GAME SYSTEM, AND GAME PROCESSING METHOD

(71) Applicant: NINTENDO CO., LTD., Kyoto (JP)

(72) Inventor: Yoshihiro Iwasa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 386 days.

(21) Appl. No.: 17/888,876

(22) Filed: Aug. 16, 2022

(65) Prior Publication Data
US 2023/0302367 A1    Sep. 28, 2023

(30) Foreign Application Priority Data
Feb. 4, 2022  (JP) .................................. 2022-016598

(51) Int. Cl.
*A63F 13/798*  (2014.01)
*A63F 13/46*   (2014.01)
(Continued)

(52) U.S. Cl.
CPC ............ *A63F 13/798* (2014.09); *A63F 13/46* (2014.09); *A63F 13/58* (2014.09); *A63F 13/69* (2014.09); *A63F 13/812* (2014.09); *A63F 13/87* (2014.09)

(58) Field of Classification Search
CPC .......... A63F 13/46; A63F 13/58; A63F 13/69; A63F 13/798; A63F 13/812; A63F 13/87;
(Continued)

(56) References Cited

U.S. PATENT DOCUMENTS 3,589,725 A * 6/1971 Townsend ................. A63D 5/04
                                                        377/5
3,931,966 A * 1/1976 Walker ..................... A63D 5/04
                                                        473/65
(Continued)

FOREIGN PATENT DOCUMENTS

CA    1245361 A  * 11/1988  ............. A63F 13/12
JP    6057738       12/2016
(Continued)

OTHER PUBLICATIONS

Nov. 14, 2023 Office Action issued in Japanese Patent Application No. 2022-016598, pp. 1-4 [machine translation included].

*Primary Examiner* — Milap Shah
(74) *Attorney, Agent, or Firm* — Nixon & Vanderhye P.C.

(57) ABSTRACT

During play of a multi-player competitive game, a specified number of sets of play is performed on the basis of an operation input by a player, and a score based on a play result and a total score of the scores calculated so far are calculated for each play. Player information regarding each player of the multi-player competitive game is updated as necessary and displayed, regardless of whether all players have completed play in a predetermined set, such that the player information is displayed in a display order corresponding to rankings based on total scores obtained so far. Furthermore, final rankings are displayed on the basis of the total scores after completion of the specified number of sets of play by all the players.

35 Claims, 23 Drawing Sheets

(51) Int. Cl.
*A63F 13/58* (2014.01)
*A63F 13/69* (2014.01)
*A63F 13/812* (2014.01)
*A63F 13/87* (2014.01)

(58) Field of Classification Search
CPC ........ A63D 2005/042; A63D 2005/044; A63D 2005/046; A63D 2005/048; A63D 5/00; A63D 5/04
See application file for complete search history.

(56) References Cited

U.S. PATENT DOCUMENTS

| | | | | |
|---|---|---|---|---|
| 3,974,483 | A * | 8/1976 | Brunson | A63D 5/04 377/5 |
| 5,523,736 | A * | 6/1996 | Gosselin | A63D 5/04 473/54 |
| 5,842,929 | A * | 12/1998 | Moody | A63D 5/04 473/70 |
| 6,579,173 | B1 * | 6/2003 | Okuda | A63F 13/45 463/6 |
| 6,912,432 | B1 * | 6/2005 | Shea | A63D 5/04 473/54 |
| 7,435,184 | B1 * | 10/2008 | Tsujita | A63D 5/00 473/54 |
| 8,641,545 | B2 * | 2/2014 | Meigs | A63D 5/00 473/54 |
| 8,771,094 | B2 * | 7/2014 | Meigs | A63D 5/04 473/57 |
| 9,457,261 | B2 * | 10/2016 | Vaioli | A63D 5/04 |
| 2001/0024977 | A1 * | 9/2001 | Funaki | A63F 7/0664 473/54 |
| 2002/0010032 | A1 * | 1/2002 | Stiteler | A63D 5/04 463/40 |
| 2002/0171204 | A1 * | 11/2002 | Martin | F41J 3/0076 273/378 |
| 2005/0186999 | A1 * | 8/2005 | Melgosa | A63F 13/812 463/2 |
| 2007/0156267 | A1 * | 7/2007 | Nozaki | A63F 13/30 700/91 |
| 2007/0191125 | A1 * | 8/2007 | Minard | A63D 5/04 473/54 |
| 2009/0143883 | A1 * | 6/2009 | Pines | A63D 5/04 434/249 |
| 2010/0173719 | A1 * | 7/2010 | Simeone | A63D 5/04 473/70 |
| 2011/0034261 | A1 * | 2/2011 | Kawaguchi | A63D 5/04 473/54 |
| 2011/0124424 | A1 * | 5/2011 | Mruk | A63D 3/00 473/54 |
| 2012/0009997 | A1 * | 1/2012 | Youm | A63F 13/335 463/42 |
| 2013/0237334 | A1 * | 9/2013 | Meigs | A63D 5/04 473/54 |
| 2014/0200692 | A1 * | 7/2014 | Thurman | G09B 19/0038 700/91 |
| 2014/0206445 | A1 | 7/2014 | Abe | |
| 2015/0343314 | A1 * | 12/2015 | Jones | A63F 13/812 463/42 |
| 2016/0290772 | A1 * | 10/2016 | Hong | A63F 13/86 |
| 2017/0189810 | A1 | 7/2017 | Hong | |

FOREIGN PATENT DOCUMENTS

| | | |
|---|---|---|
| JP | 2018-511020 | 4/2018 |
| JP | 2018-166965 | 11/2018 |

* cited by examiner

FIG. 3

| | FIRST ROUND | | RESULT OF FIRST BALL ROLL | RESULT OF SECOND BALL ROLL |
|---|---|---|---|---|
| RANKING → PLAYER NAME → | | TOTAL SCORE AT CURRENT TIME POINT ↓ | | |
| 1st | DDDDD | 10 | ►◄ | |
| 2nd | GGGGG | 9 | 9 | |
| 3rd | JJJJJ | 8 | 8 | |
| 4th | FFFFF | 7 | 7 | |
| 4th | PPPPP | 7 | 7 | |
| 6th | IIIII | 6 | 6 | |
| 6th | CCCCC | 6 | 6 | |
| 6th | HHHHH | 6 | 6 | |
| BORDERLINE | | | | |
| 9th | BBBBB | 5 | 5 | |
| 9th | EEEEE | 5 | 5 | |
| 9th | KKKKK | 5 | 5 | |
| 9th | LLLLL | 5 | 5 | |
| 12th | AAAAA | 4 | 4 | |
| 12th | MMMMM | 4 | 4 | |
| 12th | NNNNN | 4 | 4 | |
| 12th | OOOOO | 4 | 4 | |

| FIRST ROUND | | | |
|---|---|---|---|
| 1st DDDDD | 10 | ►◄ | |
| 2nd GGGGG | 9 | 9 | |
| 3rd JJJJJ | 8 | 8 | |
| 4th FFFFF | 7 | 7 | |
| 4th PPPPP | 7 | 7 | |
| 6th IIIII | 6 | 6 | |
| 6th CCCCC | 6 | 6 | |
| 6th HHHHH | 6 | 6 | |

─────────── BORDERLINE ───────────

| 9th BBBBB | 5 | 5 | |
|---|---|---|---|

| 3rd AAAAA | 8 | 4 | 4 |
|---|---|---|---|
| 9th EEEEE | 5 | 5 | |
| 9th KKKKK | 5 | 5 | |
| 9th LLLLL | 5 | 5 | |
| 12th MMMMM | 4 | 4 | |
| 12th NNNNN | 4 | 4 | |
| 12th OOOOO | 4 | 4 | |

FIG. 5

| FIRST ROUND | | | | |
|---|---|---|---|---|
| 1st | DDDDD | 10 | ▶◀ | |
| 2nd | GGGGG | 9 | 9 | |
| 3rd | JJJJJ | 8 | 8 | |
| 3rd | AAAAA | 4 | 4 | 4 |
| 4th | FFFFF | 7 | 7 | |
| 4th | PPPPP | 7 | 7 | |
| 6th | IIIII | 6 | 6 | |
| 6th | CCCCC | 6 | 6 | |
| 6th | HHHHH | 6 | 6 | |
| BORDERLINE | | | | |
| 9th | BBBBB | 5 | 5 | |
| 9th | EEEEE | 5 | 5 | |
| 9th | KKKKK | 5 | 5 | |
| 9th | LLLLL | 5 | 5 | |
| 12th | MMMMM | 4 | 4 | |
| 12th | NNNNN | 4 | 4 | |
| 12th | OOOOO | 4 | 4 | |

F I G. 8
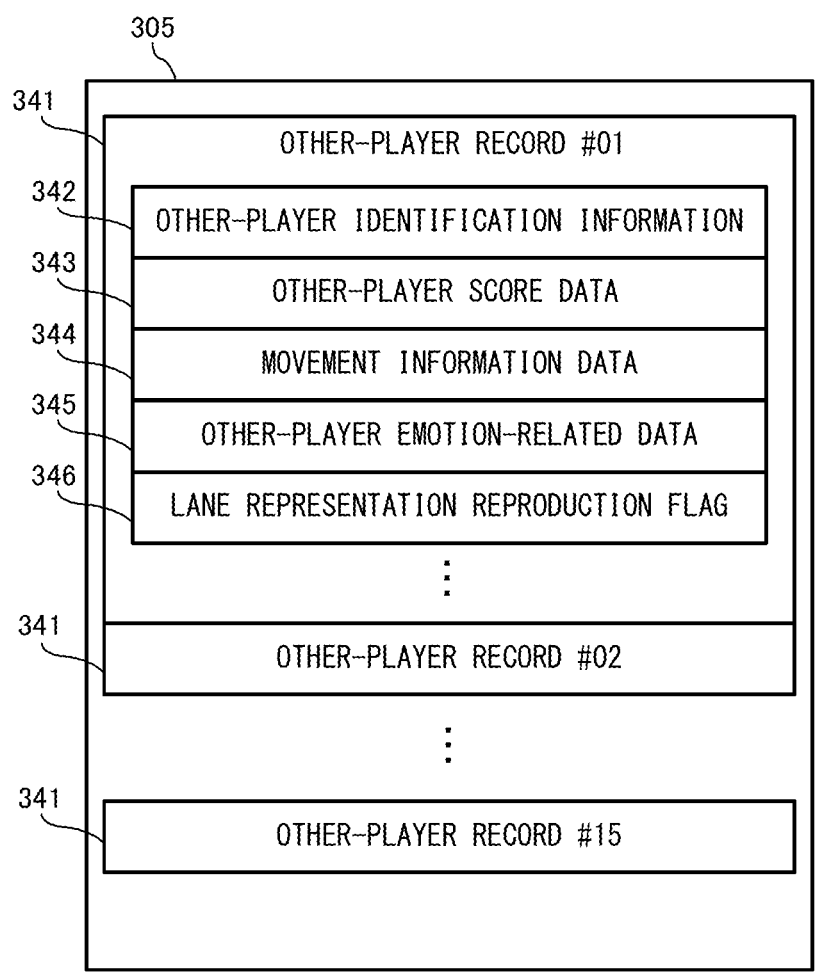

F I G. 1 2
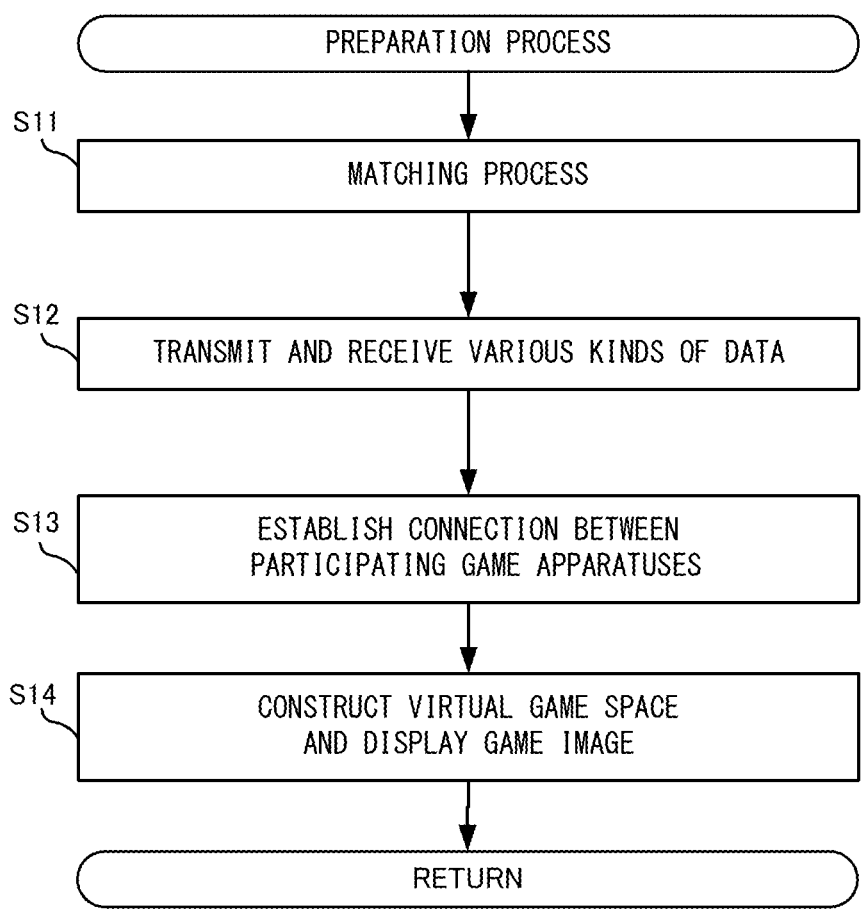

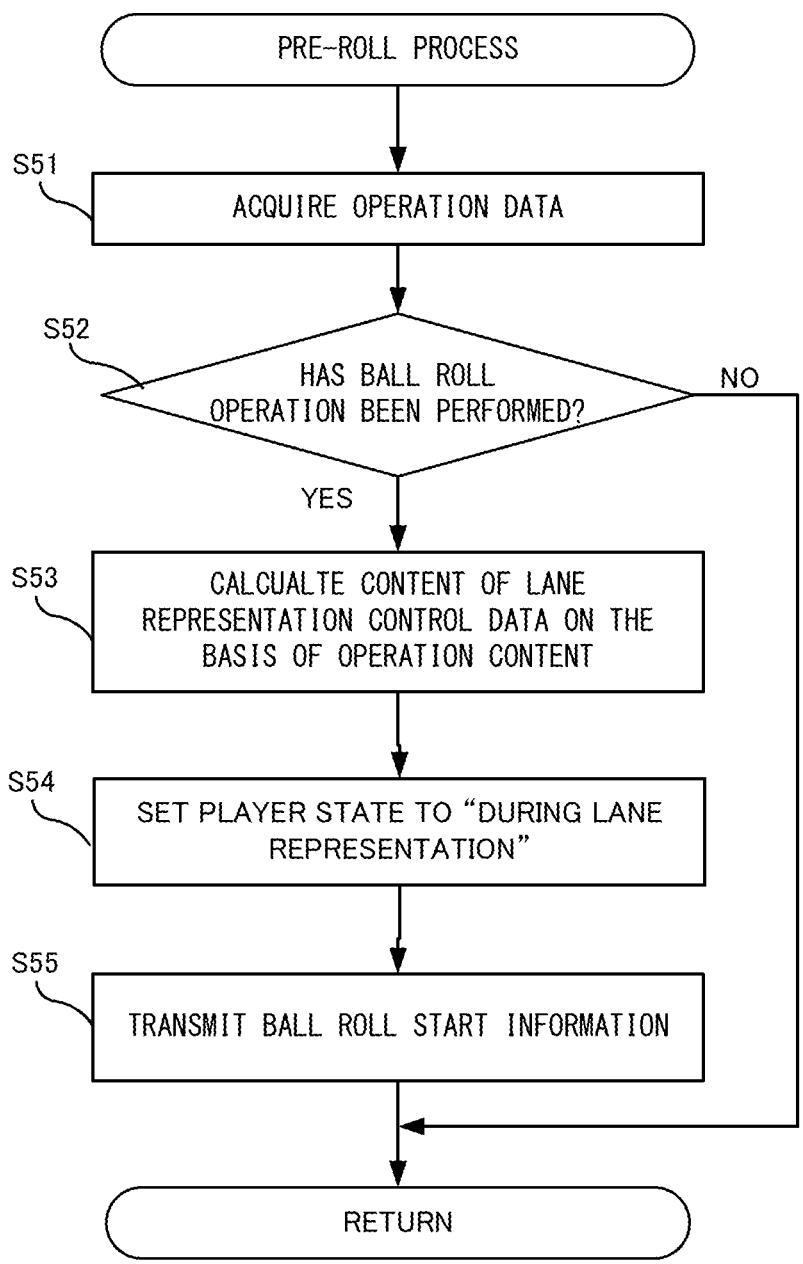
F I G. 1 6

COMPUTER-READABLE NON-TRANSITORY STORAGE MEDIUM HAVING GAME PROGRAM STORED THEREIN, GAME APPARATUS, GAME SYSTEM, AND GAME PROCESSING METHOD

CROSS REFERENCE TO RELATED APPLICATION

This application claims priority to Japanese Patent Application No. 2022-016598 filed on Feb. 4, 2022, the entire contents of which are incorporated herein by reference.

FIELD

The present disclosure relates to information processing that executes a multi-player competitive game in which a ranking of a player is determined by a total score based on the results of a specified number of sets of play by the player.

BACKGROUND AND SUMMARY

Conventionally, a bowling game has been known as one of the sports games.

In the bowling game described above, if multi-player play is assumed to be performed, a lane in which play is performed by a player is generally considered to be displayed on a game screen. However, in this case, the situations of the other players cannot be recognized from the screen, so that the feeling of play becomes similar to that of a one-player game until the scores of all the players are shown.

In this respect, in a game such as a bowling game, there is room for making a player aware of the presence of other players to improve the entertainment characteristics of the game.

Therefore, it is an object of the present disclosure to provide a computer-readable non-transitory storage medium having a game program stored therein, a game apparatus, a game system, and a game processing method which are capable of providing an environment that allows a player to play while being aware of other players in real time in a competitive game in which multiple players compete for a score based on a specified number of sets of play.

In order to attain the object described above, for example, the following configuration examples are exemplified.

A configuration example is directed to a computer-readable non-transitory storage medium having stored therein a game program causing a computer of an information processing apparatus to execute a multi-player competitive game in which a ranking of a player is determined by a total score based on a play result of a specified number of sets of play by the player, the game program causing the computer to, during play of the multi-player competitive game, perform the specified number of sets of play on the basis of an operation input by a player, and calculate, for each play, a score based on a play result and a total score of the scores calculated so far; update as necessary and display player information regarding each player of the multi-player competitive game, regardless of whether all players have completed play in a predetermined set, such that the player information is displayed in a display order corresponding to rankings based on total scores obtained so far; and display final rankings on the basis of the total scores after completion of the specified number of sets of play by all the players.

According to the above configuration example, even if the game is a competitive game played by many players but is a game of a competition in which the progress of play itself can be carried out by a single player, it is possible to show changes in score and ranking to the player in real time. Accordingly, the player can play while being aware of the opponents, so that it is possible to improve the entertainment characteristics of the game. In addition, since the display order is updated as necessary, it is also possible to grasp the overall flow of the game through change of a display order.

In another configuration example, the multi-player competitive game may be a multi-player competitive game which is played while communication is being performed with a plurality of other information processing apparatuses. The game program may cause the computer to transmit at least the score corresponding to the play result for each play or the total score for each play, to the other information processing apparatuses, and receive at least the score corresponding to the play result for each play or the total score for each play of another player from each of the other information processing apparatuses.

In another configuration example, the game program may further cause the computer to, during play of the multi-player competitive game, make an image display instruction to display a predetermined image at a display position of the player information regarding a player, on the basis of an operation input by the player, and transmit information indicating that the image display instruction has been made, to the other information processing apparatuses, and display the player information regarding each player such that the predetermined image is placed at the display position of the player information regarding the player in accordance with the image display instruction being made, and when information indicating that the image display instruction has been made is received from another information processing apparatus, the predetermined image is placed at a display position of the player information regarding a player of the other information processing apparatus.

According to the above configuration example, by making an instruction to display the predetermined image in real time, it is possible to further represent the situation of the player along the ranking change.

In another configuration example, the game program may cause the computer to, during play of the multi-player competitive game, make the image display instruction on the basis of an operation input by the player in a period in which the play in each set is not performed.

According to the above configuration example, during play, it is possible to prevent the player from performing other operations other than operations directly related to the play. In addition, it is easier to make an instruction to display the predetermined image between plays, that is, at a timing when the ranking is changing due to the play result of the player himself/herself, so that it is possible to make it easier for the other players to grasp the game situation of the player.

In another configuration example, the player information may include at least information for identifying the player and the total score.

In another configuration example, the player information may further include at least a play result of a set played immediately before.

According to the above configuration example, it is possible to provide detailed information regarding the content of play to each player.

In another configuration example, the competitive game may be a bowling game.

According to the above configuration example, in the bowling game, it is possible to make the player aware of the presence of opponents. Accordingly, it is possible to reduce the feeling of playing alone to improve the entertainment characteristics of the game as a competitive game.

In another configuration example, the game program may cause the computer to generate a game image including at least a player character to be operated on the basis of an operation input by the player, a lane on which the player character rolls a ball, and player information regarding each player.

In another configuration example, the game program may cause the computer to generate a game image further including at least one opponent player character to be operated on the basis of an operation input by another player and at least one opponent lane on which the opponent player character rolls a ball.

According to the above configuration example, it is possible to make it easier to make the player aware of the presence of the other players.

According to the present disclosure, it is possible to provide an environment that allows a player to play while being aware of the presence of other players in real time in a competitive game in which multiple players compete for a score based on a specified number of sets of play.

BRIEF DESCRIPTION OF THE DRAWINGS

FIG. 3 illustrates a non-limiting example of a ranking table;

FIG. 5 is a non-limiting example diagram for describing the ranking change representation;

FIG. 8 illustrates a non-limiting example of the data structure of other-player data 305;

FIG. 12 is a non-limiting example flowchart showing the details of a preparation process;

FIG. 16 is a non-limiting example flowchart showing the details of a pre-roll process;

DETAILED DESCRIPTION OF NON-LIMITING EXAMPLE EMBODIMENTS

Hereinafter, an exemplary embodiment will be described.

[Hardware Configuration of Information Processing Apparatus]

First, an information processing apparatus for executing information processing according to the exemplary embodiment will be described. The information processing apparatus is, for example, a smartphone, a stationary or hand-held game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

Figure 1:
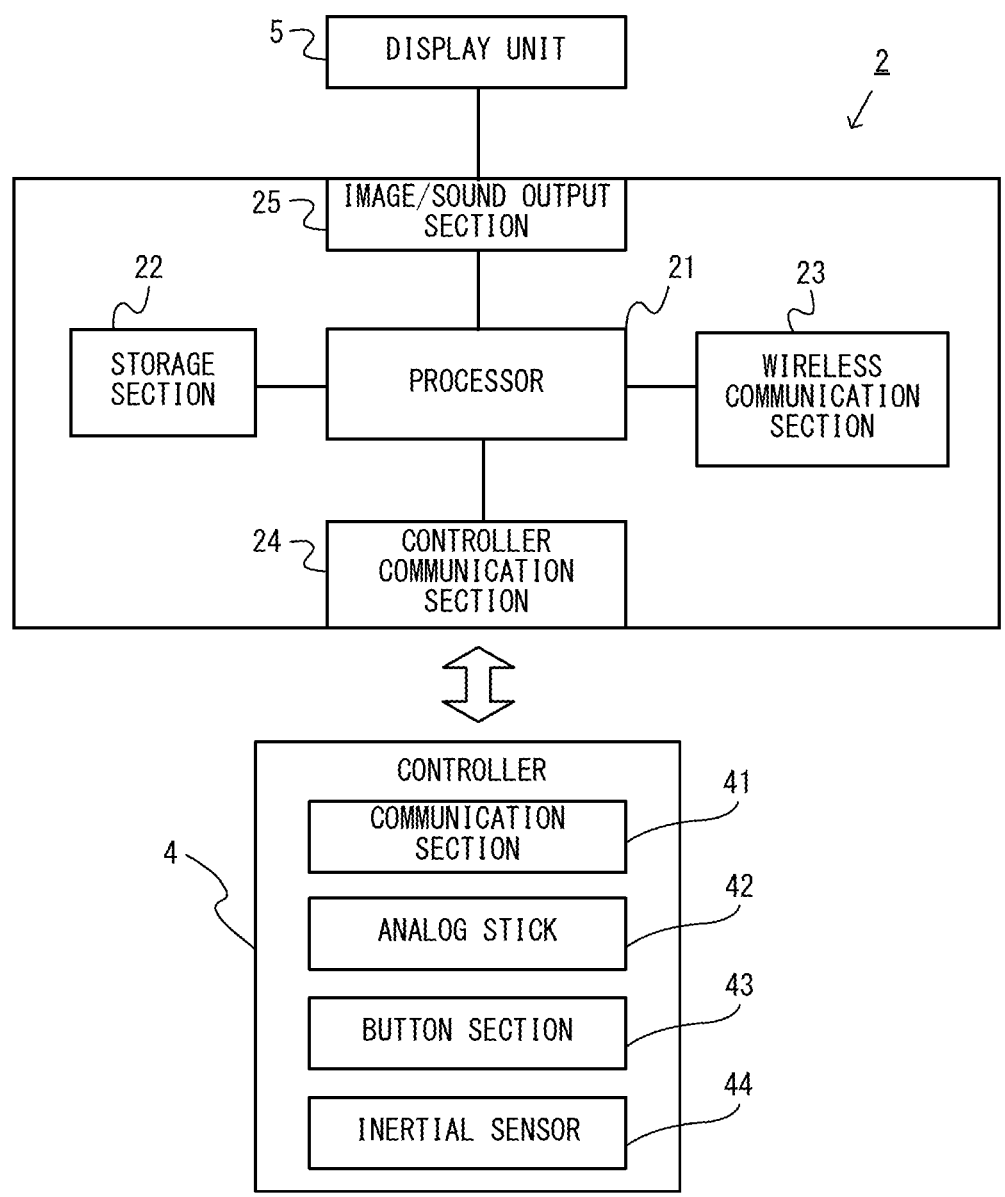
FIG. 1 is a block diagram showing a non-limiting example of the internal configuration of a game apparatus 2.

FIG. 1 is a block diagram showing an example of the internal configuration of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 or a predetermined server device. As this wireless communication, for example, internet communication or short-range wireless communication is used.

The game apparatus 2 also includes a controller communication section 24 for the game apparatus 2 to perform wired or wireless communication with a controller 4.

Moreover, a display unit 5 (for example, a television or the like) is connected to the game apparatus 2 via an image/sound output section 25. The processor 21 outputs an image and sound generated (for example, by executing the above information processing) to the display unit 5 via the image/sound output section 25.

Next, the controller 4 will be described. Although not shown, the controller 4 of the exemplary embodiment has a housing having a vertically long shape, and can be held in the orientation in which the housing is vertically long. The housing has a shape and a size that allow the housing to be held with one hand when the housing is held in the orientation in which the housing is vertically long.

The controller 4 includes at least one analog stick 42 which is an example of a direction input device. The analog stick 42 can be used as a direction input section with which a direction can be inputted. By tilting the analog stick 42, a user is allowed to input a direction corresponding to the tilt direction (also input a magnitude corresponding to the tilt angle). In addition, the controller 4 includes a button section 43 including various operation buttons. For example, the controller 4 may include a plurality of operation buttons on a main surface of the housing.

Moreover, the controller 4 includes an inertial sensor 44. Specifically, the controller 4 includes an acceleration sensor and an angular velocity sensor as the inertial sensor 44. In the exemplary embodiment, the acceleration sensor detects the magnitudes of accelerations along predetermined three axial directions. In addition, the angular velocity sensor detects angular velocities about predetermined three axes.

The controller 4 also includes a communication section 41 for performing wired or wireless communication with the controller communication section 24. The content of a direction input to the analog stick 42, information indicating a pressed state of the button section 43, and various detection results by the inertial sensor 44 are repeatedly outputted to the communication section 41 and transmitted to the game apparatus 2 at appropriate timings.

[Game Assumed in Exemplary Embodiment]

Next, an outline of game processing (an example of information processing) executed by the game apparatus 2 according to the exemplary embodiment will be described. First, a game assumed in the exemplary embodiment is a multi-player competitive game. In particular, a multi-player competitive game, in which a ranking of a player is determined on the basis of a total score based on the results of a specified number of sets of play, is assumed. Specifically, in the exemplary embodiment, a bowling game that can be played by up to 16 players is assumed. In the exemplary embodiment, the bowling game is assumed to consist of ten frames per game. In each frame, a player can roll a ball up to two times (can roll a ball three times at only the tenth frame). In other words, one frame is one set of two ball rolls (two plays) (one game includes ten sets). In the following, play related to each frame (play for one frame) is referred to as "one-set play". In addition, the first ball roll play and the second ball roll play at each frame (and the third ball roll play at the tenth frame) are each referred to as a "one-unit play".

Moreover, the bowling game according to the exemplary embodiment is a knockout type game. Specifically, the game starts with 16 players, the players ranked 9th or lower are eliminated at the end of frame 3; the players ranked 6th or lower are eliminated at the end of frame 6; and the players ranked 4th or lower are eliminated at the end of frame 9. In other words, the first to third frames are considered as a "first round", the fourth to sixth frames are considered as a "second round", the seventh to ninth frames are considered as a "third round", and the tenth frame is considered as a "final" by the players ranked 3rd or higher.

Moreover, in the exemplary embodiment, a communication competition in which communication is performed via the internet is assumed. Specifically, one player uses one game apparatus, and up to 16 game apparatuses are connected so as to be able to communicate with each other. In another exemplary embodiment, one game apparatus 2 can be configured to be able to be used by a plurality of players for playing against each other (for example, a split screen is used for play by four players or eight players).

Here, the overall progress of one game in the bowling game according to the exemplary embodiment will be described. In the exemplary embodiment, first, when a player performs an operation to instruct participation in a game, game participant matching is performed via a predetermined server. After that, when participants are determined, game apparatuses 2 of the participants are connected to each other via P2P (over a network). When the game is started, the player performs a ball roll operation for the first ball roll of frame 1. A ball moves on a lane on the basis of the ball roll operation, pin(s) are knocked down, and the above one-unit play for the first ball roll of frame 1 is completed. Then, the player performs one-unit play for the second ball roll of frame 1. When the one-unit play for the second ball roll is completed, the player waits for another player to complete play for this frame. When all the players have completed play for this frame, a frame end representation is displayed, and the game proceeds to play for the next frame. That is, in this bowling game, progress control, in which completion of one-set play by all participants (players who have not been eliminated) is waited for and the game then proceeds to play for the next frame, is performed.

Players who have been eliminated from the game shift to a "watching mode" during the game. In the watching mode, the players can no longer play, but can watch play of the other players (can also leave the game).

Figure 2:
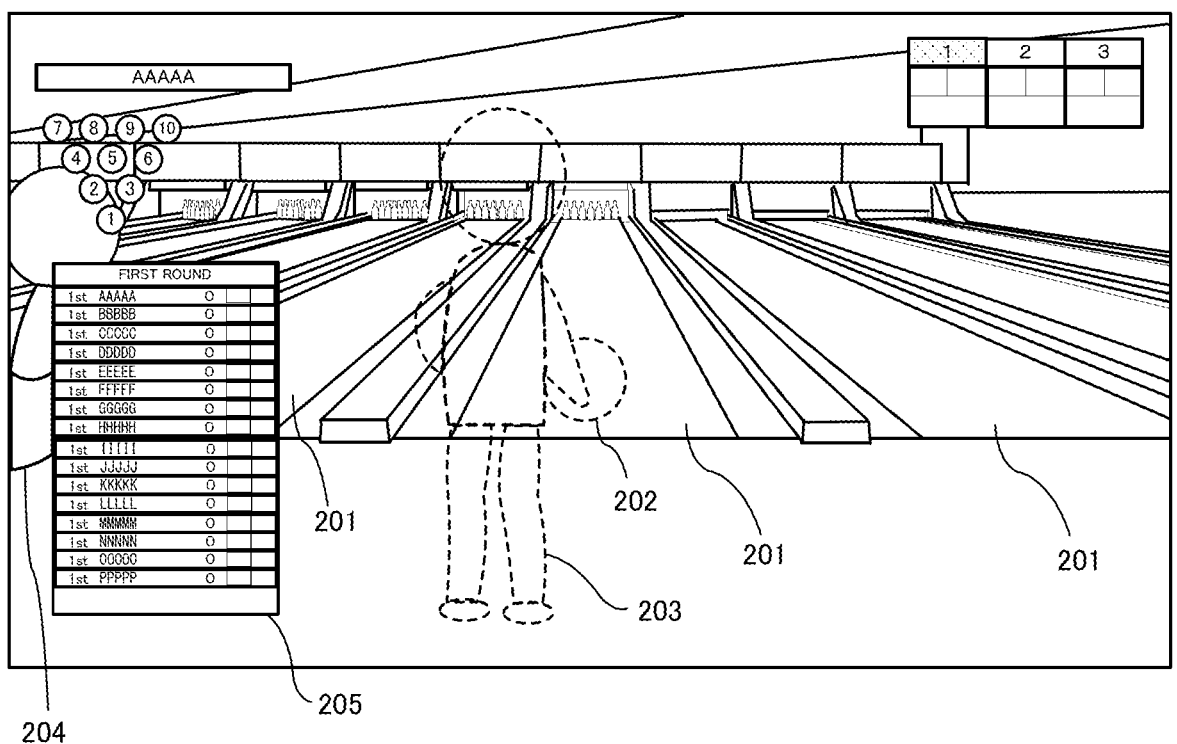
FIG. 2 illustrates a non-limiting example of a game screen according to an exemplary embodiment.

FIG. 2 illustrates an example of a game image of the bowling game according to the exemplary embodiment. In FIG. 2, a plurality of lanes 201 and a player character object (hereinafter, referred to as PC) 203 carrying a ball object (hereinafter, referred to as ball) 202 are displayed. In the actual game screen, the PC 203 and the ball 202 in a state before a ball roll are displayed semi-transparently (shown by dotted lines in the drawing) in order to improve the visibility of the lane 201. When a ball roll operation is performed, the semi-transparent display of the ball 202 and the PC 203 is cancelled, and the ball 202 and the PC 203 are displayed normally. In addition, a bowler character object (hereinafter, referred to as bowler character) 204 is also displayed in the lane 201 to the left of the PC 203. That is, it is shown that a bowler character related to another player is playing using the lane 201 to the left of the PC 203. In addition, although not shown in this screen example, still another bowler character 204 also exists further to the left in the virtual space. Moreover, in this screen example, as for the lane 201 to the right of the lane 201 used by the PC 203, an unused state (no other bowler character 204 is placed) is shown. However, as a matter of course, another bowler character 204 may also be placed in the lane 201 on the right side.

In a state where such an image is displayed, when the player performs a predetermined ball roll operation, the PC 203 makes a motion of rolling the ball 202. Then, the ball 202 moves in the depth direction of the lane 201 (in a direction in which pins are located) with a movement trajectory and a movement speed based on the content of the ball roll operation. In the following description, (representation of) a series of movements of the PC 203, the ball 202, the pins, etc., from the start of the ball-rolling motion of the PC 203 until reaching a state where pin(s) are knocked down and a score can be determined, is referred to as "lane representation".

Moreover, in the game image in FIG. 2, a ranking table 205 is displayed in substantially a lower left region. Hereinafter, the ranking table 205 will be described. FIG. 3 is an enlarged view of the ranking table 205. The ranking table 205 consists of a set of a plurality of player information objects 211. Each of the player information objects 211 is, for example, an object that is a horizontally long plate-like polygon with an image (texture) indicating a player name, etc. One player information object 211 is associated with one player. In the exemplary embodiment, a competition of 16 players is assumed, so that 16 player information objects 211 are prepared at the start of the game, and the number of player information objects 211 displayed in the ranking table 205 can change according to the progress of the game (elimination). For example, the players ranked 9th or lower are not displayed at and after frame 4, and the players ranked 6th or lower are not displayed at and after frame 7. In addition, the player information objects 211 are displayed in ascending order based on total scores. In addition, the ranking table 205 also includes a borderline image for indicating a reference for the elimination described above.

The contents displayed in each player information object 211 will be described. The information displayed in each player information object 211 includes information indicating a ranking, a player name, a total score (at the current time), the result of the first ball roll at the current frame, and the result of the second ball roll at the current frame. In addition, as the information indicating the results of the first ball roll and the second ball roll, the numbers of pins knocked down with the first ball roll and the second ball roll, and a score mark indicating the play result, such as strike or spare are displayed. Moreover, in addition to the above, in FIG. 3, in a part of the player information objects 211, an emotion image 212 is also displayed at the left end position. The emotion image 212 will be separately described later.

Here, in the exemplary embodiment, changes in ranking are reflected in real time in the ranking table 205. Specifically, in the exemplary embodiment, a ranking is calculated on the basis of the total score at the time when each player completes one-unit play (the ranking is a tentative ranking at that time). Then, the display of the ranking table 205 is updated as necessary so as to reflect this ranking without waiting for all the players to complete one-unit play (in other words, one-set play). That is, for example, instead of updating the ranking table 205 each time play at one frame is completed, the display contents (change in ranking) of the ranking table 205 are updated according to the situations of the other players even in the middle of one-unit play by the player. For example, it is assumed that, in one-unit play, the ranking of a player is displayed as 3rd place before starting a ball roll operation. This ranking may change to 5th place before the player starts a ball roll operation. Furthermore, even after the player performs a ball roll operation, while the ball is moving on the lane, a change in the ranking of another player may be reflected in the ranking table 205, so that the display position of the player information object 211 of the player may change from moment to moment. For example, a gradual decrease of the ranking is displayed even while the ball is moving, and the display position may have changed to 14th place when the ball collides with pin(s). Then, the number of pins knocked down with this one-unit play by the player is determined, and a total score at that time is calculated. As a result of reflecting this total score, the display position of the player information object 211 of the player may change to 2nd place.

Figure 4:
FIG. 4 is a non-limiting example diagram for describing a ranking change representation.

Next, an example of a ranking change representation in which a change in ranking is reflected in the ranking table 205 will be described with reference to FIG. 3 described above and FIGS. 4 and 5. Here, the case where the ranking of a player with a player name "AAAAA" is changed from 12th place shown in FIG. 3 to 3rd place will be described as an example. When (a display position corresponding to) a ranking after the change is determined, the display of the ranking table 205 changes from the state in FIG. 3 through a state shown in FIG. 4 to a state shown in FIG. 5. FIG. 4 shows a state in the middle of the ranking change representation, and FIG. 5 shows that the ranking after the change is displayed. In the exemplary embodiment, as the ranking change representation, a representation in which the player information object 211 moves up or down toward the display position of the ranking after the change, is performed. That is, a representation in which the player information object 211 moves toward the display position of the ranking after the change while replacing a player information object 211 located immediately above or below this player information object 211, is performed. FIG. 4 described above shows a state where the player information object 211 of the player name "AAAAA" (and the emotion image 212) are moving upward at a position slightly above the position in the state of FIG. 3. FIG. 5 shows a state where the player information object 211 has further moved upward from the state of FIG. 4 and the movement has ended at 3rd place. In addition, along with such movement due to the ranking change, the display position of the borderline image may also change in the up-down direction as appropriate. Moreover, this representation is one example, and in another exemplary embodiment, the ranking change representation may be performed by another expression method.

In FIG. 5, there are two players at 3rd place, so that one of the two players is displayed at the fourth position from the top. In the exemplary embodiment, as for the display order at the same ranking, players are displayed in the order from the player for which a ranking change has occurred earlier, but may be displayed in the reverse order, or may be displayed in the ascending order by player name.

Here, in the exemplary embodiment, a change in ranking is performed for each player in turn. Although described in detail later, even in a state where there are a plurality of players who have completed one-unit play in the same period time, information of the players are registered in an update queue in the order from the player whose ranking change has become possible earlier, and control is performed such that the ranking change is reflected for each player in the order from the earliest registered player. By displaying the ranking change representation for each player as described above, it is made to appear that there is constant or continuous "change" in terms of the appearance of the ranking table 205, as compared to the case where the ranking table is changed at once for a plurality of players. Accordingly, the player is allowed to recognize that the situations of the other players are changing in real time, and that the player is performing a competitive play against multiple players.

As for the timing of starting the ranking change representation for a certain player, in the exemplary embodiment, more precisely, the change representation is started after the lane representation for one-unit play by the bowler character of each player is completed. In a specific example of starting the change representation, for example, parts of the lanes 201 adjacent to the lane 201 for the PC 203 are included in the field of view of a virtual camera in FIG. 2 described above, and displayed as parts of a game image. Then, in each of the adjacent lanes 201 as well, a motion of each player in one-unit play is reproduced at predetermined timing on the basis of data transmitted from another game apparatus. For example, in the case of the lane 201 to the left of the PC 203, when another player on this lane 201 performs a ball roll operation on his or her game apparatus 2, data regarding the content of this play is transmitted from this game apparatus 2 to the game apparatus 2 of the player. In the game apparatus 2 of the player, a process of reproducing a motion in one-unit play on the left lane 201 is performed on the basis of the data. Then, after the one-unit play is completed, the ranking change representation for the player on the left lane 201 is performed. That is, control, in which the ranking change representation is started at or after the timing when the bowler character 204 on the left lane 201 rolls a ball, pin(s) are knocked down, and the score (number of the pins knocked down) at that time would have been determined, is performed. Accordingly, the player is prevented from feeling uncomfortable with (reproduction of) the movement of the bowler character 204 related to the other player and the timing at which the ranking change representation is displayed. For example, the player can be prevented from feeling uncomfortable due to, for example, the ranking being changed before the other bowler character 204 rolls a ball.

Moreover, the display of the ranking table 205 with such real-time change is also performed on a display unit 5 while the player is waiting for another player to complete play after the player completes play for the second ball roll. In the exemplary embodiment, a predetermined waiting screen is displayed with a message such as "Waiting for another player" while the player is waiting for another player to complete play. In this screen as well, the ranking table 205 is displayed. Therefore, the player is allowed to see how the rankings change (in real time) even during waiting after ending one-set play of the player, and to grasp the overall situation of the game.

Next, the aforementioned emotion image 212 will be described. The emotion image 212 is a predetermined image associated with each player, and is an image (may be called an icon, stamp, or the like) indicating an emotion or the like in this example. Examples of such an image include a facial image with a smile, a facial image with a disappointed expression, and a facial image with a surprised expression. In addition, the emotion image 212 may be an image showing movement associated with an emotion, such as a pose of raising a fist. The display of the emotion image 212 is started when the player performs a predetermined operation (hereinafter, referred to as an emotion display operation) for displaying an emotion image. In addition, as for the display position of the emotion image 212, in the exemplary embodiment, the emotion image 212 is displayed adjacent to the left end of the player information object 211. Moreover, the emotion image 212 is an image to be temporarily displayed, and is deleted, for example, when 5 seconds elapse after the emotion image 212 is displayed.

In addition, during the above ranking change representation, the emotion image 212 also moves (while being displayed at the left end) together with the player information object 211 (see FIG. 3 to FIG. 5 described above).

Here, in the exemplary embodiment, a limit is placed on a period in which the emotion display operation is possible. In the exemplary embodiment, in a period in which the above-described one-unit play is not performed (period other than a period from the time at which a ball roll operation becomes possible to the time at which the above lane representation is completed), it is possible to accept the emotion display operation. In the exemplary embodiment, while the player is waiting for another player to complete play after the player completes one-set play, it is possible to perform the emotion display operation. Such timing can be said to be the timing when a ball roll result of the player is reflected in the ranking table 205. That is, the emotion display operation is made possible when the ranking change representation is being performed on the basis of a play result of the player. Accordingly, the emotion image 212 can be put on the movement of the player information object 211 that is moving, so that it is easier to convey the player's own situation to his or her opponents. In addition, similarly, it is easier for the player to grasp the situations of the other players. Moreover, by placing a limit on the period in which the emotion display operation is possible and by not accepting the emotion display operation during one-unit play as described above, the player is allowed to concentrate on the ball roll operation.

[Details of Game Processing of Exemplary Embodiment]

Next, the bowling game processing in the exemplary embodiment will be described in more detail with reference to FIG. 6 to FIG. 24.

[Data to be Used]

Figure 6:
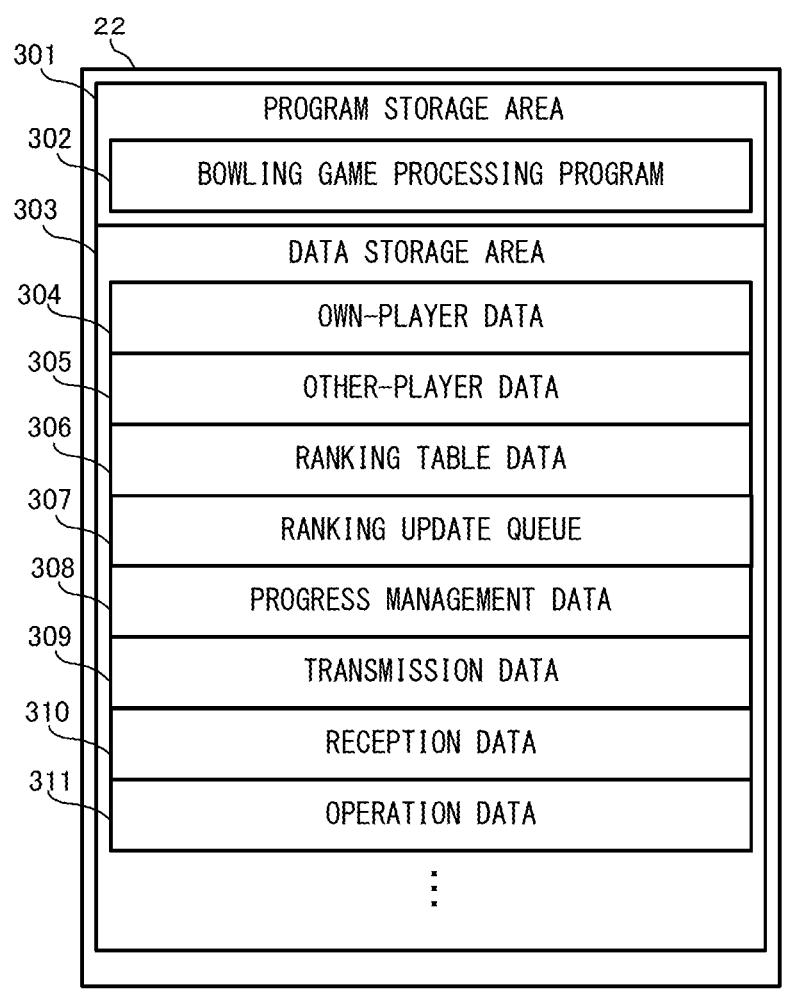
FIG. 6 illustrates a memory map showing a non-limiting example of various kinds of data stored in a storage section 22.

First, an example of various kinds of data to be used in this bowling game processing will be described. FIG. 6 illustrates a memory map showing an example of various kinds of data stored in the storage section 22 of the game apparatus 2. The storage section 22 includes a program storage area 301 and a data storage area 303. In the program storage area 301, a bowling game processing program 302 is stored. In addition, in the data storage area 303, data such as own-player data 304, other-player data 305, ranking table data 306, a ranking update queue 307, progress management data 308, transmission data 309, reception data 310, and operation data 311 are stored.

The bowling game processing program 302 is a program for executing the bowling game processing according to the exemplary embodiment.

Figure 7:
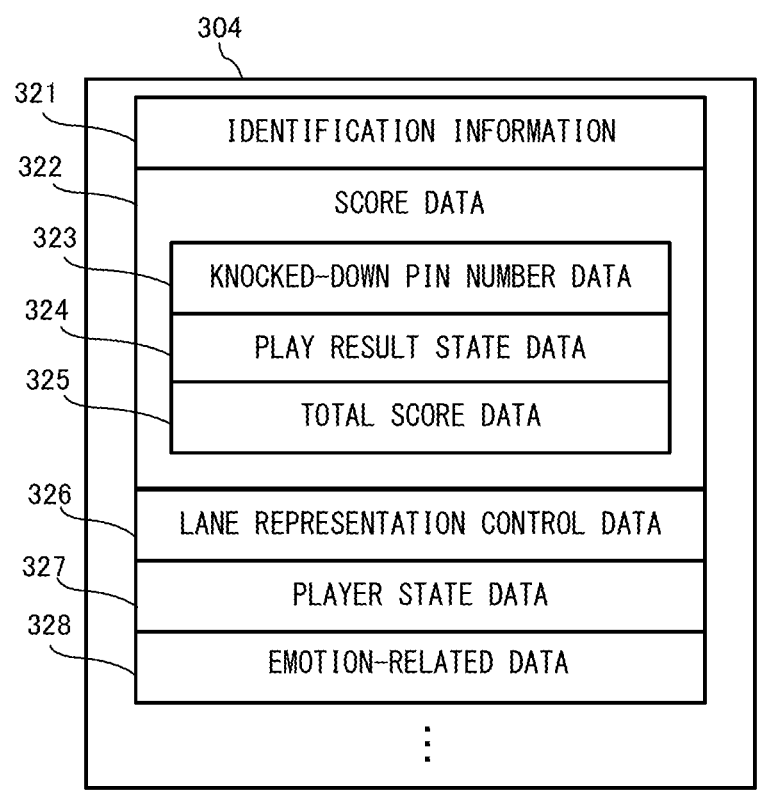
FIG. 7 illustrates a non-limiting example of the data structure of own-player data 304.

The own-player data 304 is data regarding the player himself/herself. FIG. 7 illustrates an example of the data structure of the own-player data 304. The own-player data 304 includes at least identification information 321, score data 322, lane representation control data 326, player state data 327, and emotion-related data 328.

The identification information 321 is information for identifying the own player from among the players who participate in the game.

The score data 322 is data regarding the score of the player, and includes knocked-down pin number data 323, play result state data 324, and total score data 325. The knocked-down pin number data 323 is data that indicates the number of pins knocked down with each one-unit play described above and is stored for each frame. The play result state data 324 is data for indicating a play result of each one-unit play such as strike, spare, split, or gutter. The total score data 325 is data updated each time one-unit play is completed, and is data indicating the total score at that time (that is, indicating the latest total score).

The lane representation control data 326 is data for controlling the lane representation in certain one-unit play. That is, the lane representation control data 326 is data for controlling the motions of the PC 203, the ball 202, and the pins until a score is determined after a ball roll operation is performed. For example, when the ball roll operation is performed, a movement direction (ejection direction) and a movement speed (initial speed) of the ball 202 are calculated on the basis of the content of the ball roll operation and are stored as the lane representation control data 326. Then, on the basis of the lane representation control data 326, the game apparatus 2 controls the movement of the ball 202, determines whether the ball 202 collides with any pins, and controls the movement of the pin(s) (with which the ball has collided). That is, the lane representation control data 326 is data for representing the movement of the ball and the pins on the lane until a score is determined after the ball roll operation is performed.

The player state data 327 is data for indicating the state of the PC 203 (player) during the game. Specifically, in the exemplary embodiment, in the game processing, four states, "before ball roll", "during lane representation", "completion of ball roll", and "waiting", are used as player states. The "before ball roll" is a state corresponding to a period in which it is possible to perform the ball roll operation and the ball roll operation is accepted. The "during lane representation" is a state corresponding to a period in which the lane representation is being displayed. The "completion of ball roll" is a state immediately after the completion of the lane representation. The "waiting" is a state where the player has completed one-set play and is waiting for another player to complete play. The "before ball roll" is set as an initial state for the player state data 327.

The emotion-related data 328 is data regarding the emotion image. The emotion-related data 328 includes information indicating whether an instruction to display the emotion image has been made, information designating or specifying the content of the emotion image to be displayed, etc.

Referring back to FIG. 6, the other-player data 305 is data regarding other players. FIG. 8 illustrates an example of the data structure of the other-player data 305. The other-player data 305 includes other-player records 341, for 15 players, corresponding to the other players, respectively. The data of these records can be updated as appropriate on the basis of data (reception data 310 described later) received from the other game apparatuses 2. Each other-player record 341 includes data such as other-player identification information 342, other-player score data 343, movement information data 344, other-player emotion-related data 345, and a lane representation reproduction flag 346.

The other-player identification information 342 is information for uniquely identifying each other player.

The other-player score data 343 is information regarding the score of each other player. The data structure of the other-player score data 343 is the same as that of the score data 322.

The movement information data 344 is information transmitted from each of the other game apparatuses 2, and is coordinate data indicating the positions of a ball and pins and data indicating the postures thereof. The lane representation for the other player is controlled.

The other-player emotion-related data 345 is data regarding the emotion image for each other player. The data structure of the other-player emotion-related data 345 is the same as the above-described emotion-related data 328.

The lane representation reproduction flag 346 is a flag for indicating whether the lane representation for another player is being performed. If the lane representation reproduction flag 346 is ON, it indicates that the lane representation for the player is being performed. In other words, while this flag is ON, the lane representation for the other player is controlled on the basis of the movement information data 344.

Figure 9:
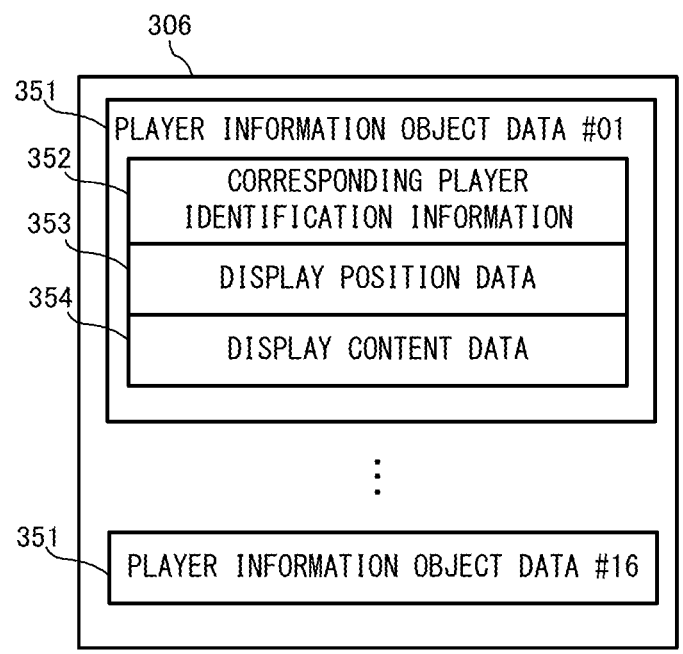
FIG. 9 illustrates a non-limiting example of the data structure of ranking table data 306.

Referring back to FIG. 6, the ranking table data 306 is data regarding the ranking table 205. FIG. 9 illustrates an example of the data structure of the ranking table data 306. The ranking table data 306 includes player information object data 351, for 16 players, corresponding to the player information objects 211, respectively. Each player information object data 351 includes at least corresponding player identification information 352, display position data 353, and display content data 354.

The corresponding player identification information 352 is information for identifying the player associated with the player information object 211. The display position data 353 is data determined on the basis of a ranking, and is data indicating a display position in the ranking table 205. The display content data 354 is data that defines contents (ranking, player name, total score, etc.) to be displayed as the player information object 211. In addition, the ranking table data 306 also includes information indicating the display position of the above borderline, etc.

Referring back to FIG. 6, the ranking update queue 307 is a queue for temporarily registering information of players who satisfy a condition for performing the ranking change representation. In the exemplary embodiment, when the lane representation in certain one-unit play for another player has been completed and score data for the one-unit play has been received, it is determined that the condition for performing the ranking change representation is satisfied. The other players who have satisfied this condition are registered in the queue in order, and are each deleted from the queue when the ranking change representation therefor is started.

The progress management data 308 is data for managing the progress of the bowling game. The progress management data 308 includes the current ranking of each player, a watcher list which is information for identifying players who have shifted to the watching mode (that is, have been eliminated), information indicating the frame to which the game has advanced, etc.

Figure 10:
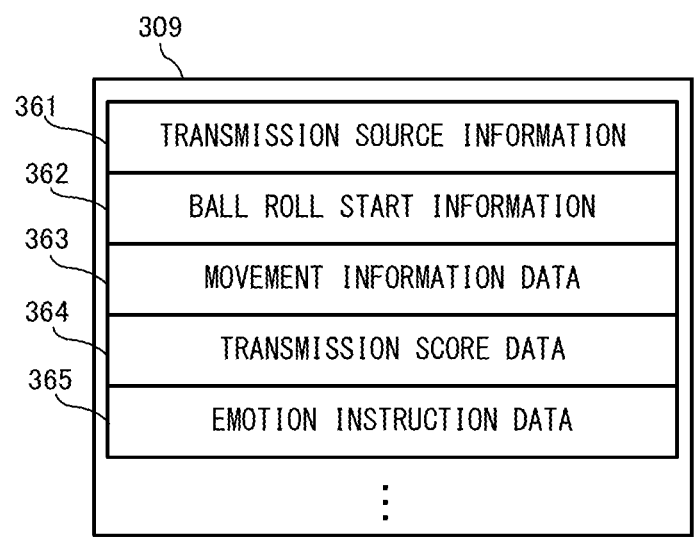
FIG. 10 illustrates a non-limiting example of the data structure of transmission data 309.

The transmission data 309 is data for transmitting information such as the score of the player to the other game apparatuses. FIG. 10 illustrates an example of the data structure of the transmission data 309. The transmission data 309 includes transmission source information 361, ball roll start information 362, movement information data 363, transmission score data 364, emotion instruction data 365, etc. These data are not always included and transmitted, but only the data necessary for the game situation is included and transmitted as the transmission data 309.

The transmission source information 361 is information indicating the game apparatus 2 or player from which the data is transmitted. This information is also information which is always included in the transmission data 309.

The ball roll start information 362 is data indicating that the ball roll operation has been performed, and is information which is included in the transmission data 309 and transmitted when the ball roll operation is performed.

The movement information data 363 is data indicating the current coordinates of the ball and the pins. The movement information data 363 is included in the transmission data 309 and transmitted during the lane representation. Then, on the basis of this data, the other game apparatus 2 controls the movement of the ball and the pins in the lane representation for the player.

The transmission score data 364 is data obtained by copying the content of the score data 322. The transmission score data 364 is included in the transmission data 309 and transmitted when one-unit play is completed and a score is determined.

The emotion instruction data 365 is data indicating that an emotion operation has been performed, and also includes information for identifying the content of the emotion operation. The emotion instruction data 365 is included in the transmission data 309 and transmitted when an emotion instruction is made.

Referring back to FIG. 6, the reception data 310 is data which is the transmission data 309 transmitted from the game apparatuses 2 and received and stored at a predetermined reception timing. Therefore, in the reception data 310, data regarding the 15 other game apparatuses 2 are stored (15 transmission data sets are stored). In addition, at the timing when the reception data 310 is received, the contents of the other-player records 341 are also updated as appropriate on the basis of the content of the reception data 310. The data structure of each other-player record 341 is the same as that of the transmission data 309, and thus the description thereof is omitted.

The operation data 311 is data indicating the contents of operations performed on the controller 4. The operation data 311 includes data indicating a pressed state of the button section 43 such as a cross key or an input state to the analog stick 42, and the acceleration and the angular velocity detected by the inertial sensor 44. The content of the operation data 311 is updated in predetermined cycles on the basis of a signal from the controller 4 (communication section 41).

In addition, various kinds of data to be used in the game processing are stored as necessary in the storage section 22.

[Details of Processing Executed by Processor 21]

Figure 11:
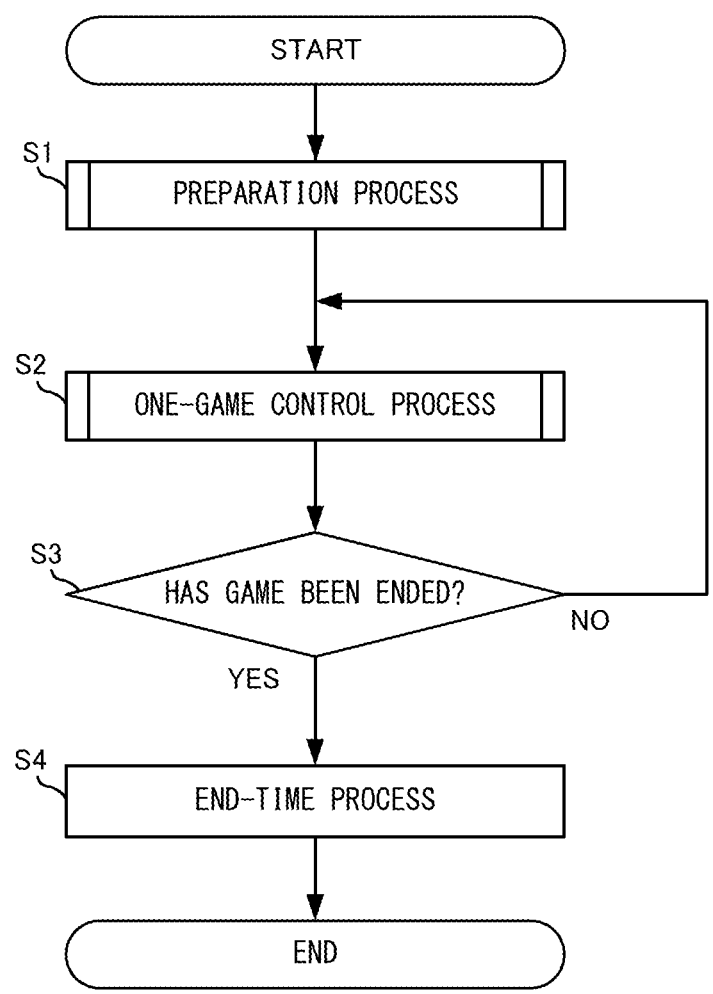
FIG. 11 is a non-limiting example flowchart showing the details of game processing of the exemplary embodiment.

Next, the bowling game processing according to the exemplary embodiment will be described in detail. FIG. 11 is a flowchart showing the details of the bowling game processing. The execution of the bowling game processing is started in accordance with an operation by the user for instructing start of a competitive play. This flowchart is merely one example of the processing. Therefore, the order of each process step may be changed as long as the same result is obtained. In addition, the values of variables and thresholds used in determination steps are also merely examples, and other values may be used as necessary.

In FIG. 11, first, in step S1, the processor 21 executes a preparation process. This process is a process of performing various preparations for starting the bowling game. FIG. 12 is a flowchart showing the details of the preparation process. In FIG. 12, first, in step S11, the processor 21 performs a matching process for matching participants of the game. This process may be performed by any method, but in the exemplary embodiment, the matching process is performed while communication is being performed with a predetermined server. Next, when the participants are determined, in step S12, the processor 21 transmits and receives information about the game apparatuses 2 participating in the game, via the predetermined server. Subsequently, in step S13, the processor 21 executes a process of establishing a connection between the participating game apparatuses 2. Next, in step S14, the processor 21 constructs a virtual game space (a floor with lanes in a virtual bowling alley), and places various objects such as the PC 203 therein. Furthermore, the processor 21 generates a game image by combining an image of the virtual space taken by the virtual camera, with an image indicating various kinds of information such as the ranking table 205, and outputs the game image to the display unit 5. This is the end of the preparation process.

Referring back to FIG. 11, next, in step S2, the processor 21 executes a one-game control process for controlling play for one game of the bowling. Here, the one-game control process (loop of steps S2 and S3) is repeatedly executed at predetermined time intervals. Specifically, the one-game control process is repeatedly executed at predetermined time intervals (corresponding to the frame rate) such as 1/60 second or 1/30 second.

Figure 13:
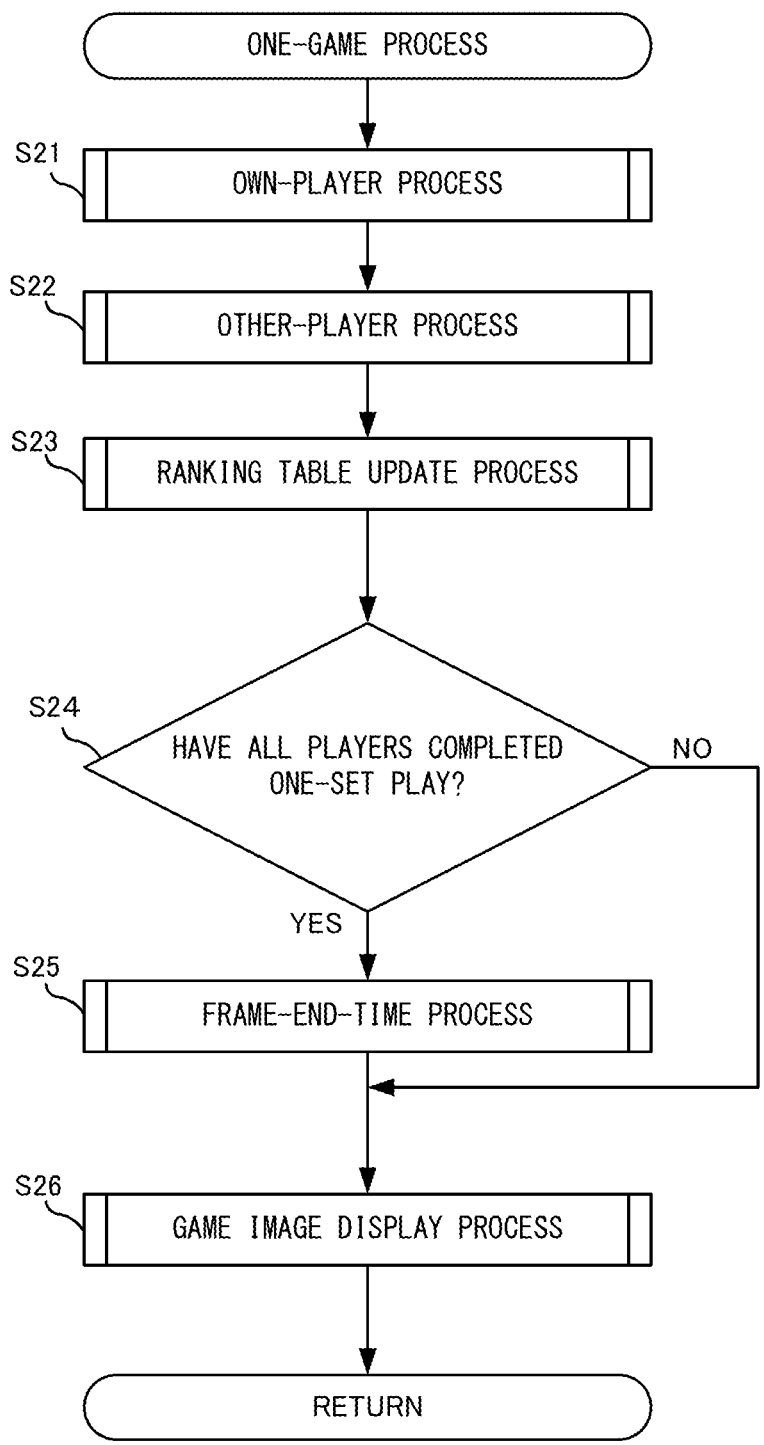
FIG. 13 is a non-limiting example flowchart showing the details of a process for one game.
Figure 14:
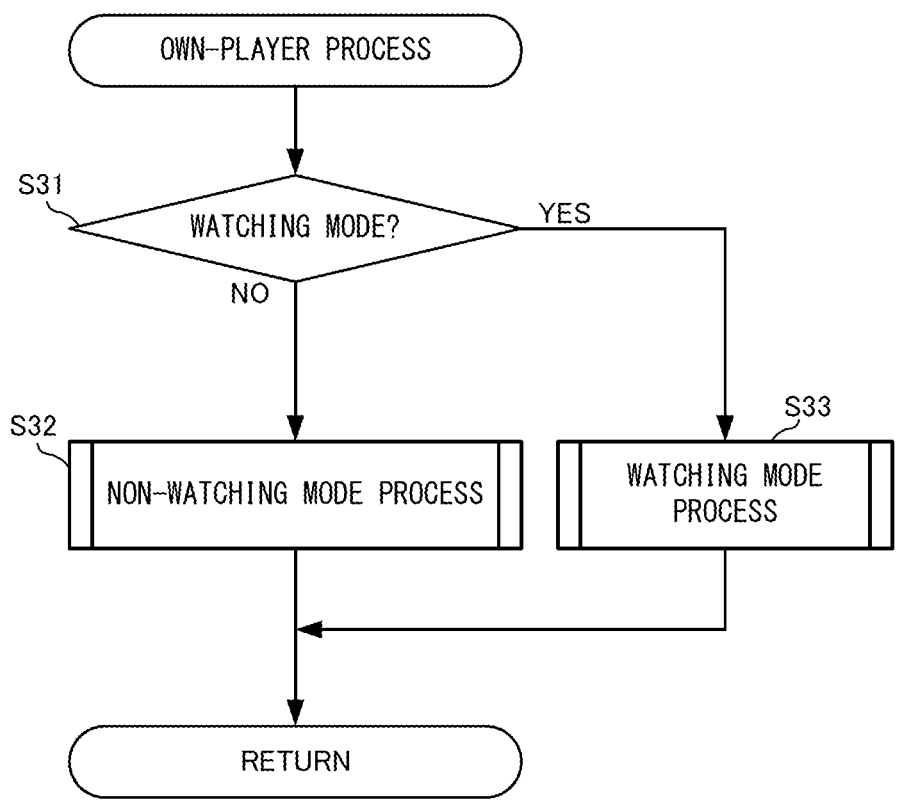
FIG. 14 is a non-limiting example flowchart showing the details of an own-player process.

FIG. 13 is a flowchart showing the details of the one-game control process. In FIG. 13, first, in step S21, the processor 21 executes an own-player process. This is a process regarding the player and the PC 203. FIG. 14 is a flowchart showing the details of the own-player process. In FIG. 14, first, in step S31, the processor 21 refers to the progress management data 308 and determines whether the player is in a "watching mode" (has been registered in the above watcher list). As a result of the determination, if the player is not in the watching mode (NO in step S31), in step S32, the processor 21 executes a non-watching mode process. On the other hand, if the player in the watching mode (YES in step S31), the processor 21 executes a watching mode process in step S33. Hereinafter, both processes will be described in detail.

Figure 15:
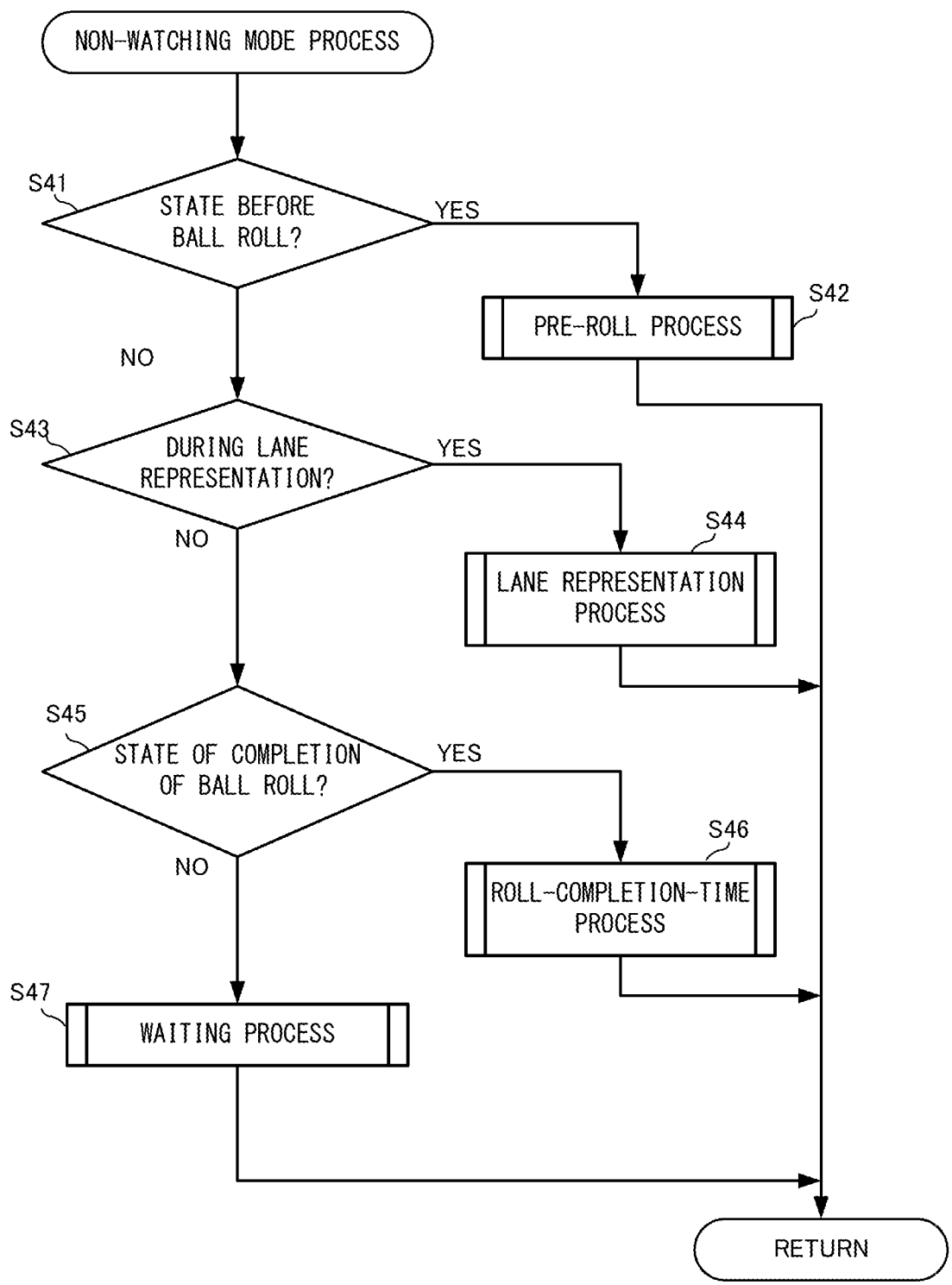
FIG. 15 is a non-limiting example flowchart showing the details of a non-watching mode process.

FIG. 15 is a flowchart showing the details of the non-watching mode process. In FIG. 15, first, in step S41, the processor 21 refers to the player state data 327 and determines whether the state of the player is "before ball roll". If the state of the player is "before ball roll" (YES in step S41), the processor 21 executes a pre-roll process in step S42.

FIG. 16 is a flowchart showing the details of the pre-roll process. In FIG. 16, first, in step S51, the processor 21 acquires the operation data 311. Next, in step S52, the processor 21 determines whether the ball roll operation has been performed. If the ball roll operation has not been performed (NO in step S52), the pre-roll process ends. If the ball roll operation has been performed (YES in step S52), in step S53, the processor 21 calculates a movement direction (ejection direction) and a movement speed (initial speed) of the ball 202, etc., on the basis of the content of the ball roll operation, and stores the calculated direction and speed, etc., as the lane representation control data 326.

Next, in step S54, the processor 21 sets "during lane representation" in the player state data 327.

Next, in step S55, the processor 21 generates the ball roll start information 362 for informing the other game apparatuses 2 that the ball roll operation has been performed. Then, the processor 21 includes the ball roll start information in the transmission data 309 and transmits the transmission data 309 to the other game apparatuses 2. Then, the processor 21 ends the pre-roll process.

Referring back to FIG. 15, when the pre-roll process is ended, the processor 21 ends the non-watching mode process. On the other hand, as a result of the determination in step S41, if the state of the player is not "before ball roll" (NO in step S41), in step S43, the processor 21 determines whether the state of the player is "during lane representation". If the state of the player is "during lane representation" (YES in step S43), the processor 21 executes a lane representation process in step S44.

Figure 17:
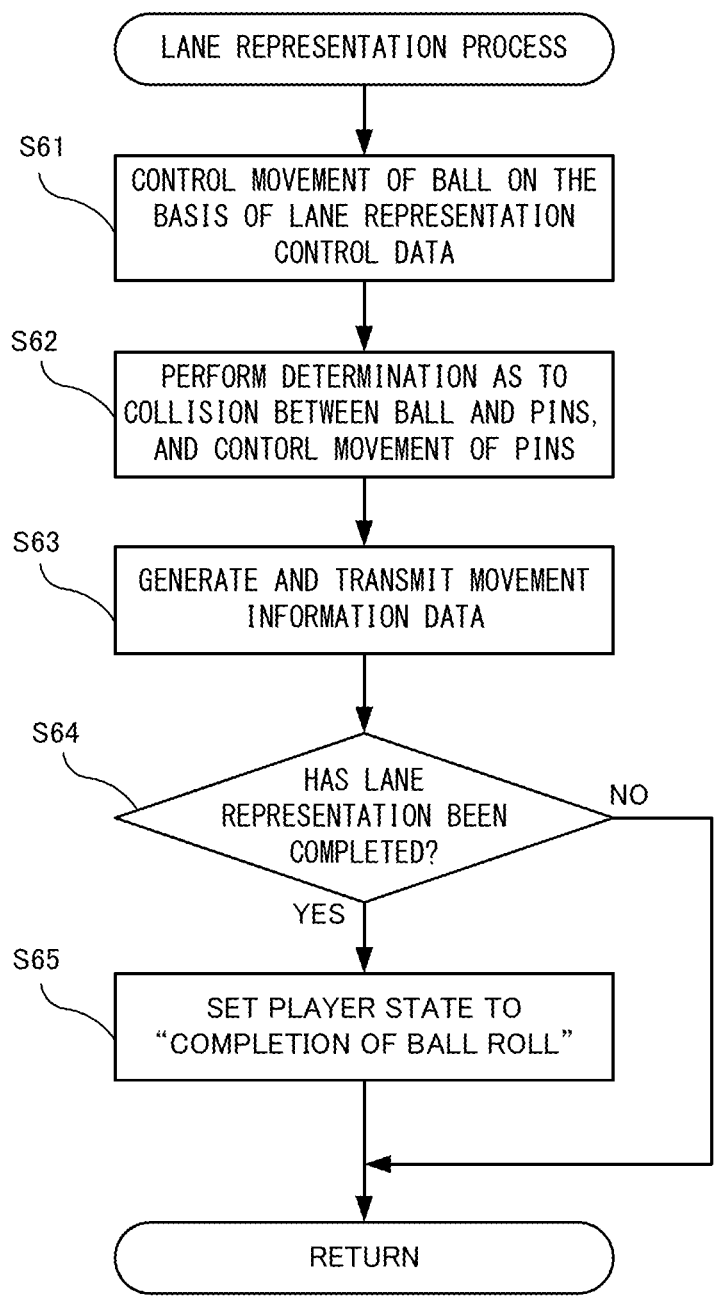
FIG. 17 is a non-limiting example flowchart showing the details of a lane representation process.

FIG. 17 is a flowchart showing the details of the lane representation process. In FIG. 17, first, in step S61, the processor 21 controls the movement of the ball 202 on the basis of the lane representation control data 326. Next, in step S62, the processor 21 determines whether the ball 202 collides with any pins, and controls the movement of the pins on the basis of the result of the determination.

Next, in step S63, the processor 21 performs a process for informing the other game apparatuses 2 of the positions of the ball and the pins after the above movement control. Specifically, the processor 21 generates the movement information data 363 including at least the coordinates of the ball and the pins after the above movement control. Then, the processor 21 includes the movement information data 363 in the transmission data 309 and transmits the transmission data 309 to the other game apparatuses 2.

Next, in step S64, the processor 21 determines whether the lane representation has been completed, on the basis of the lane representation control data 326. For example, the processor 21 determines whether the lane representation has been completed, by determining whether the ball has moved to the pit and the movement of the pins has been completed (stopped). As a result of the determination, if the lane representation has been completed (YES in step S64), in step S65, the processor 21 sets "completion of ball roll" as the state of the player. Then, the processor 21 ends the lane representation process.

Referring back to FIG. 15, when the lane representation process is ended, the processor 21 ends the non-watching mode process. On the other hand, as a result of the determination in step S43, if the state of the player is not "during lane representation" (NO in step S43), in step S45, the processor 21 determines whether the state of the player is "completion of ball roll". If the state of the player is "completion of ball roll" (YES in step S45), the processor 21 executes a roll-completion-time process in step S46.

Figure 18:
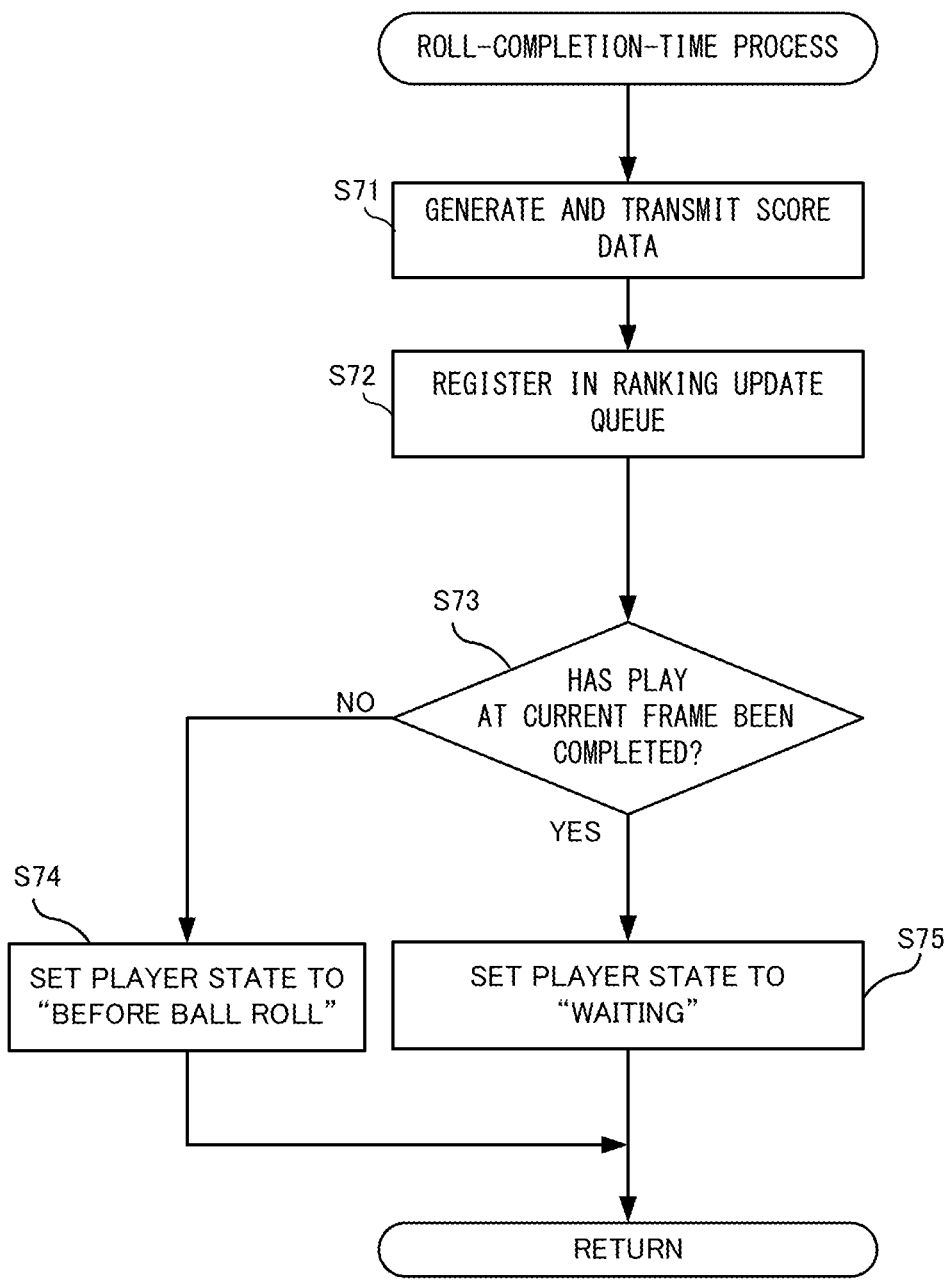
FIG. 18 is a non-limiting example flowchart showing the details of a roll-completion-time process.

FIG. 18 is a flowchart showing the details of the roll-completion-time process. In FIG. 18, first, in step S71, the processor 21 calculates the score data 322 on the basis of the result of the current ball roll. That is, the processor 21 calculates the number of pins knocked down with the current ball roll, and stores the calculated number of pins in the knocked-down pin number data 323. Furthermore, the processor 21 determines the result state of the current play such as whether the current play results in a strike or a spare, and stores the result state in the play result state data 324. Moreover, the processor 21 calculates the total score up to this time point, and stores the total score in the total score data 325. Next, the processor 21 generates the transmission score data 364 obtained by copying the score data 322. Then, the processor 21 includes the transmission score data 364 in the transmission data 309 and transmits the transmission data 309 to the other game apparatuses 2.

Next, in step S72, the processor 21 registers information for identifying the player, in the ranking update queue 307.

Next, in step S73, the processor 21 determines whether the play of the player at the current frame has been completed. That is, the processor 21 determines whether the first ball roll or the second ball roll has been completed. As a result of the determination, if the play has not been completed (NO in step S73), in step S74, the processor 21 sets "before ball roll" as the state of the player (this is a transition from the first ball roll to the second ball roll). On the other hand, if the play has been completed (YES in step S73), in step S75, the processor 21 sets "waiting" as the state of the player (this shifts the state to a state of waiting for another player to complete play). Then, the processor 21 ends the roll-completion-time process.

Referring back to FIG. 15, when the roll-completion-time process is ended, the processor 21 ends the non-watching mode process. On the other hand, as a result of the determination in step S45, if the state of the player is not "completion of ball roll" (NO in step S45), the processor 21 executes a waiting process in step S47. This process is a process in a period of waiting for another player to complete play.

Figure 19:
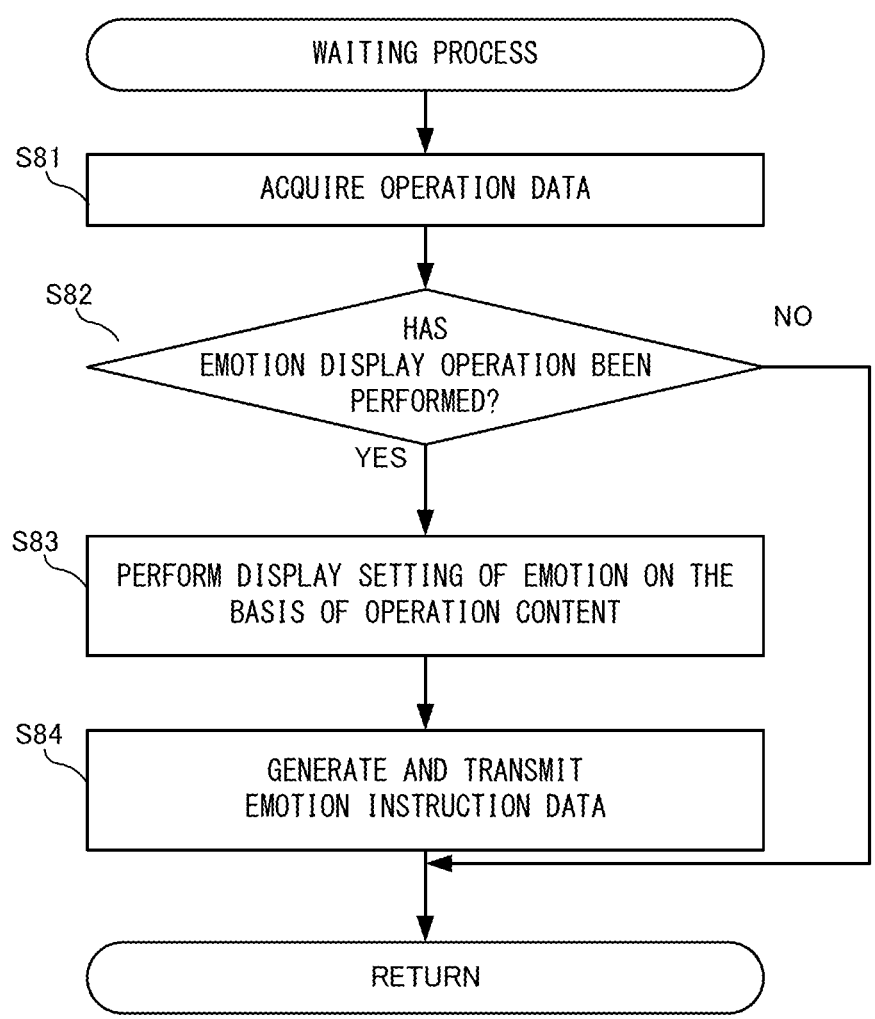
FIG. 19 is a non-limiting example flowchart showing the details of a waiting process.

FIG. 19 is a flowchart showing the details of the waiting process. In FIG. 19, first, in step S81, the processor 21 acquires the operation data 311.

Next, in step S82, the processor 21 determines whether the emotion display operation has been performed, on the basis of the operation data 311. As a result of the determination, if the emotion display operation has been performed (YES in step S82), in step S83, the processor 21 determines the content of an emotion image to be displayed, on the basis of the content of the operation. Furthermore, the processor 21 performs display setting of the emotion image such that the emotion image 212 is displayed at the left end of the player information object 211 corresponding to the player (see FIG. 4).

Next, in step S84, the processor 21 generates the emotion instruction data 365 on the basis of the content of the operation, in order to inform the other game apparatuses 2 that the emotion display operation has been performed. Then, the processor 21 generates the transmission data 309 including this emotion instruction data 365, and transmits the transmission data 309 to the other game apparatuses 2.

On the other hand, as a result of the determination in step S82, if the emotion display operation has not been performed (NO in step S82), the processes in steps S83 and S84 are skipped. Then, the processor 21 ends the waiting process.

Referring back to FIG. 15, when the waiting process is ended, the processor 21 ends the non-watching mode process.

Figure 20:
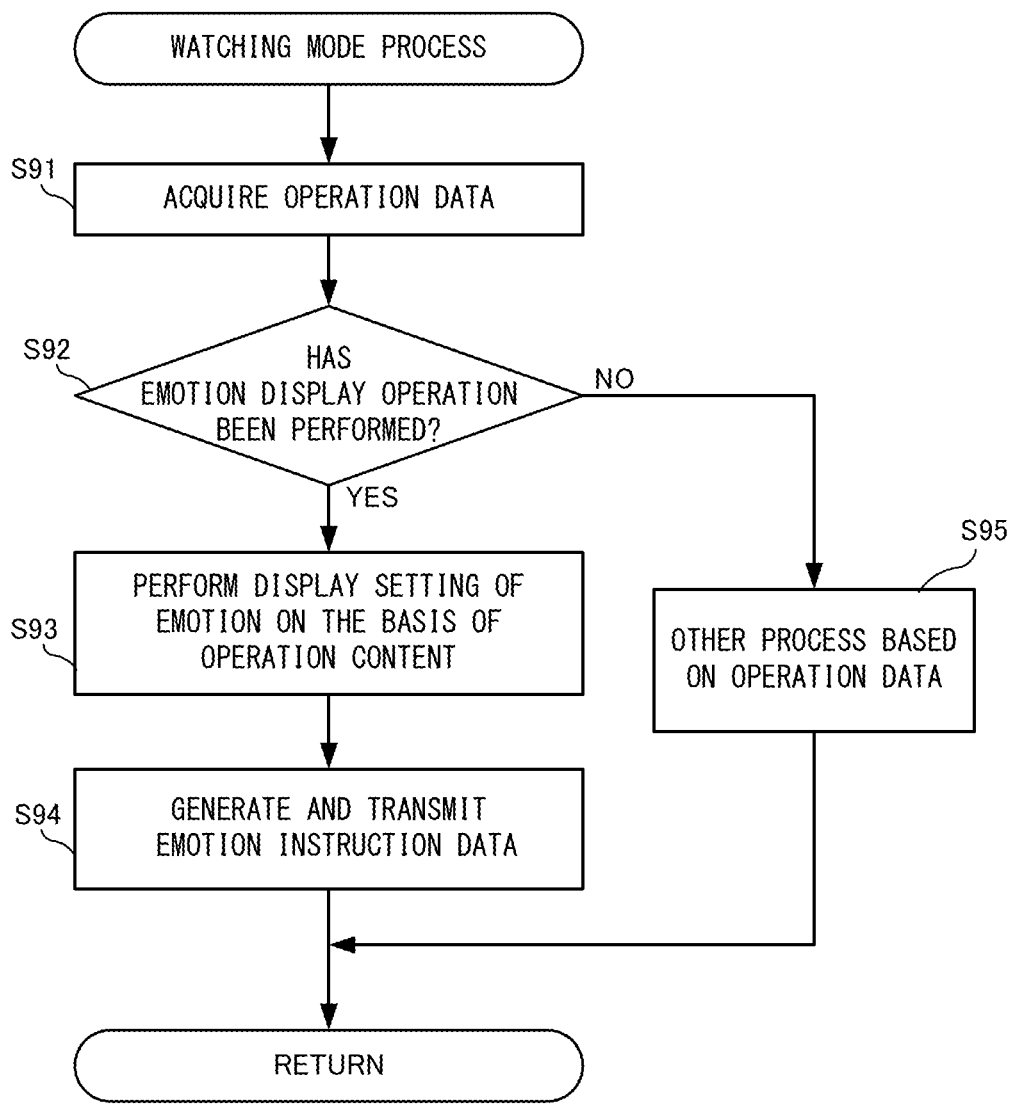
FIG. 20 is a non-limiting example flowchart showing the details of a watching mode process.

Next, the watching mode process in step S33 in FIG. 14 will be described. FIG. 20 is a flowchart showing the details of the watching mode process. In FIG. 20, first, in step S91, the processor 21 acquires the operation data 311.

Next, in step S92, the processor 21 determines whether the emotion display operation has been performed. As a result of the determination, if the emotion display operation has been performed (YES in step S92), the processor 21 executes processes in step S93 and step S94. These processes are the same as in steps S83 and S84 in FIG. 19, and thus the description thereof is omitted.

On the other hand, as a result of the determination in step S92, if the emotion display operation has not been performed (NO in step S92), in step S95, the processor 21 executes other game processing on the basis of the operation data 311. For example, a process of designating or changing a target to be watched in the watching mode, a process of operating the virtual camera, etc., are executed. Then, the processor 21 ends the watching mode process.

This is the end of the description of the own-player process in step S21.

Referring back to FIG. 13, next, in step S22, the processor 21 executes an other-player process. This process is a process for reflecting the motion of another bowler character or the emotion display operation performed by another player, on the basis of reception data from another game apparatus 2.

Figure 21:
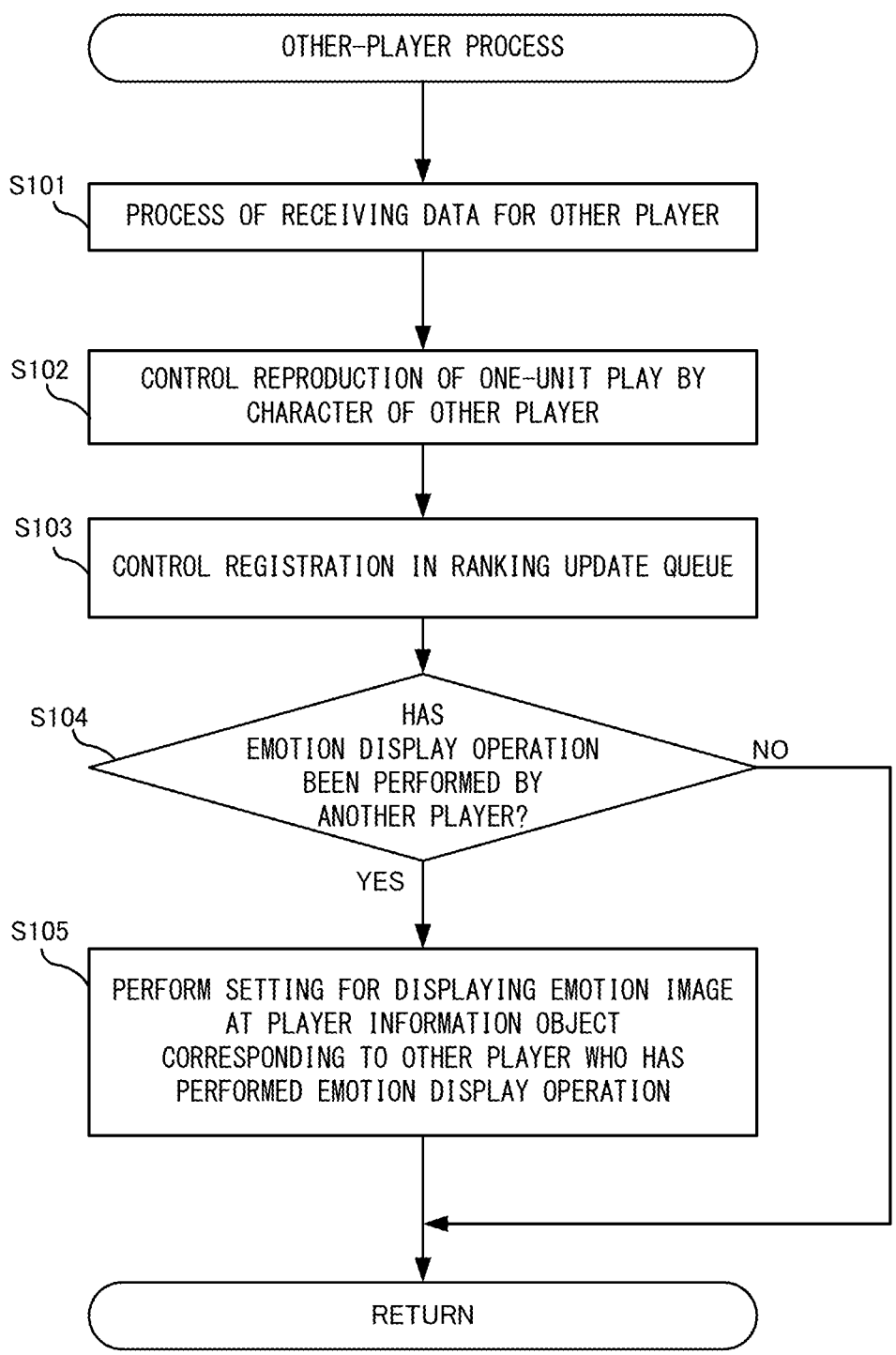
FIG. 21 is a non-limiting example flowchart showing the details of an other-player process.

FIG. 21 is a flowchart showing the details of the other-player process. First, in step S101, the processor 21 receives the transmission data 309 transmitted from another game apparatus 2, and stores the received transmission data 309 as the reception data 310. Furthermore, the processor 21 updates the content of the other-player record 341 as appropriate on the basis of the reception data 310. Specifically, if the movement information data 363 is included in the reception data 310, the movement information data 344 for the player who is the transmission source is updated. Similarly, if the transmission score data 364 is included in the reception data 310, the other-player score data 343 for the player who is the transmission source is updated. If the emotion instruction data 365 is included in the reception data 310, the other-player emotion-related data 345 for the player who is the transmission source is updated. Moreover, if the ball roll start information 362 is included in the reception data 310, the lane representation reproduction flag 346 for the player who is the transmission source is set to be ON.

Next, in step S102, the processor 21 reproduces a play (lane representation) for one ball roll by another bowler character. At this time, the processor 21 refers to the progress management data 308, extracts other players who are not in the watching mode, and controls reproduction of a play for one ball roll by only each of these players. Specifically, the processor 21 causes the other bowler character to make a predetermined ball-rolling motion, on the basis of the ball roll start information 362 included in the reception data 310. Furthermore, the processor 21 controls the movement of the ball 202 of the other player and the pins on the basis of the movement information data 363 included in the reception data 310. When the lane representation is completed, the processor 21 sets the lane representation reproduction flag 346 to be OFF.

Next, in step S103, the processor 21 controls registration in the ranking update queue 307. Specifically, the processor 21 registers information for identifying other players who satisfy the following two conditions, in the ranking update queue 307 in the order from the player who satisfies these two conditions earlier.

(1) A play (lane representation) for one ball roll by a corresponding other bowler character has been completed.

(2) The other-player score data 343 related to the current one-unit play by the corresponding other bowler character has been received.

Next, in step S104, the processor 21 determines whether the emotion display operation has been performed by another player, on the basis of the other-player emotion-related data 345. The targets to be determined as to whether the emotion display operation has been performed are all the other players including players who have entered the watching mode. As a result of the determination, if the emotion display operation has been performed by another player (YES in step S104), in step S105, the processor 21 performs setting for displaying the emotion image 212 for the other player, on the basis of the other-player emotion-related data 345. That is, the processor 21 performs setting for displaying the predetermined emotion image 212 specified by the other-player emotion-related data 345, in association with the player information object 211 corresponding to the other player who has performed the emotion display operation. On the other hand, if the emotion display operation has not been performed by another player (NO in step S104), the process in step S105 is skipped. This is the end of the other-player process.

Figure 22:
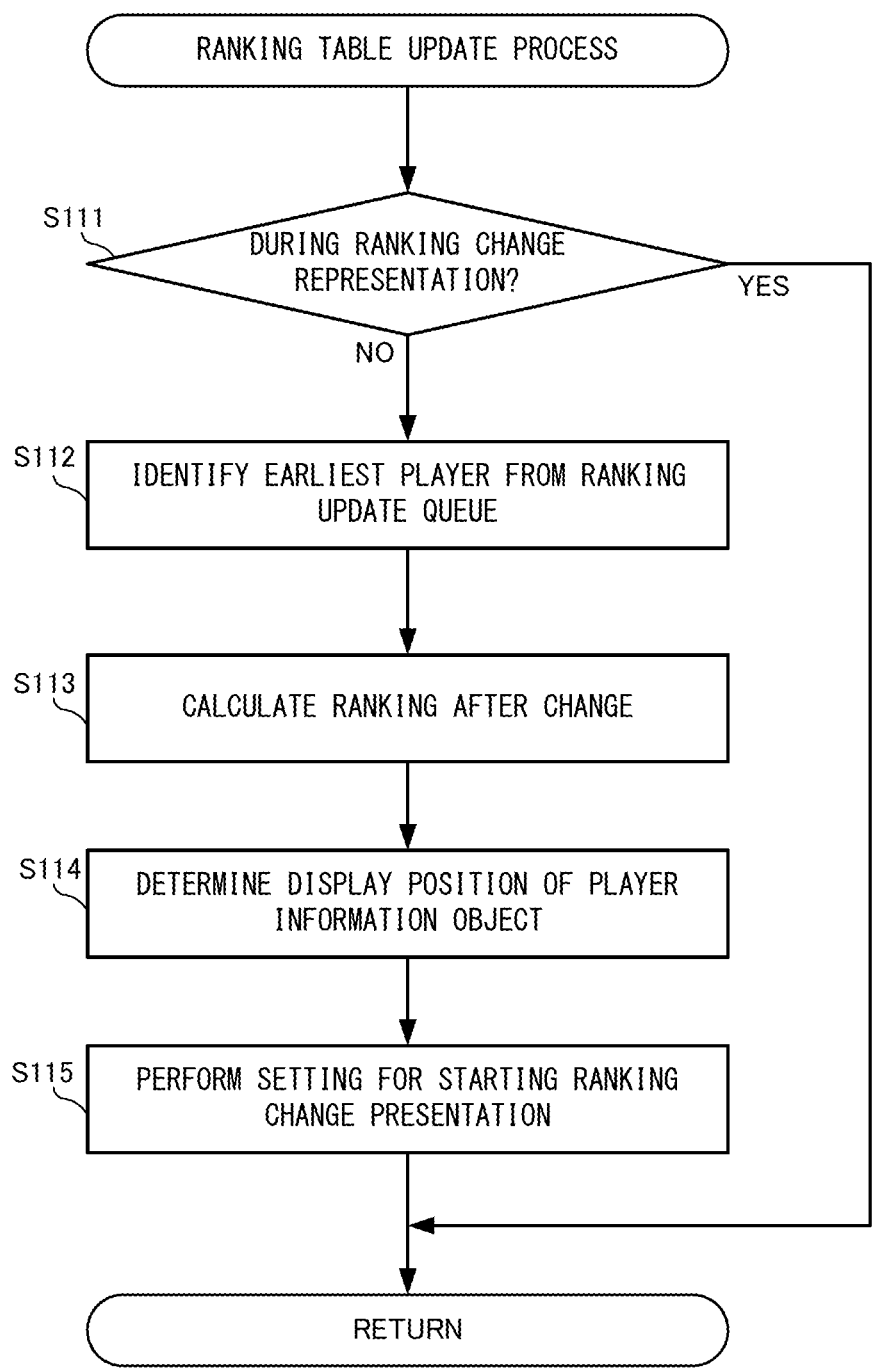
FIG. 22 is a non-limiting example flowchart showing the details of a ranking table update process.

Referring back to FIG. 13, next, in step S23, the processor 21 executes a ranking table update process. FIG. 22 is a flowchart showing the details of the ranking table update process. First, in step S111, the processor 21 determines whether the current state is during the ranking change representation as shown in FIG. 3 to FIG. 5. As a result of the determination, if the current state is not during the ranking change representation (NO in step S111), in step S112, the processor 21 acquires the earliest registered player information from the ranking update queue 307. Then, the processor 21 identifies the player for which the ranking change representation is to be performed (from among all the players including the own-player and the other players).

Next, in step S113, the processor 21 calculates the ranking after change of the player for which the ranking change representation is to be performed, on the basis of the total scores at this time point, and stores the ranking in the progress management data 308.

Next, in step S114, the processor 21 determines the final display position (movement target point), in the ranking table 205, of the player information object 211 corresponding to the player whose ranking is to be changed, on the basis of the calculated ranking.

Next, in step S115, the processor 21 performs setting for starting the ranking change representation as shown in FIG. 3 to FIG. 5. In addition, accordingly, the processor 21 deletes the information of the player for which the current ranking change representation is to be performed, from the ranking update queue 307.

On the other hand, as a result of the determination in step S111, if the current state is during the ranking change representation (YES in step S111), the processes in steps S112 to S115 are skipped (that is, the currently executed ranking change representation is continued). Then, the processor 21 ends the ranking table update process.

Referring back to FIG. 13, when the ranking table update process is ended, next, in step S24, the processor 21 determines whether one-set play has been completed for all the players who are not in the watching mode, on the basis of the reception data 310, etc. As a result of the determination, if not all the players have completed one-set play (NO in step S24), the processor 21 advances the processing to step S26 described later. On the other hand, if all the players have completed one-set play (YES in step S24), the processor 21 executes a frame-end-time process in step S25. In this process, determination as to elimination from the game as described above is performed.

Figure 23:
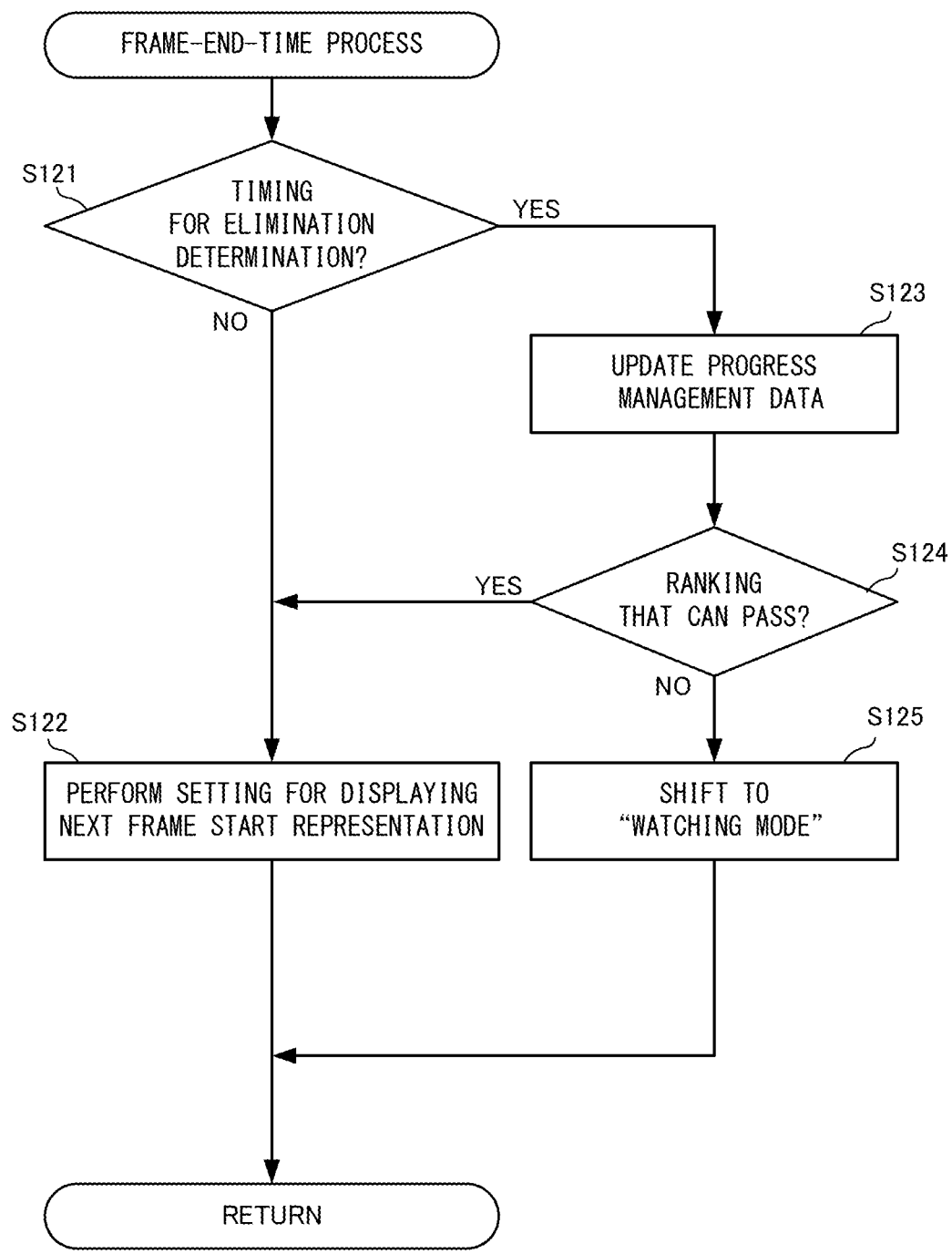
FIG. 23 is a non-limiting example flowchart showing the details of a frame-end-time process.

FIG. 23 is a flowchart showing the details of the frame-end-time process. First, in step S121, the processor 21 determines whether it is a timing for performing elimination determination, on the basis of the progress management data 308. In the exemplary embodiment, if the timing is either at the end of frame 3, at the end of frame 6, or at the end of frame 9, the processor 21 determines that it is a timing for elimination determination. As a result of the determination, if it is not a timing for elimination determination (NO in step S121), in step S122, the processor 21 performs setting for displaying a play start representation for the next frame. Then, the processor 21 ends the frame-end-time process.

On the other hand, as a result of the determination in step S121, if it is a timing for elimination determination (YES in step S121), in step S123, the processor 21 first updates progress management data (watcher list) for the other players. That is, the processor 21 performs elimination determination for the other players. In the exemplary embodiment, as described above, the players ranked 9th or lower are eliminated at the end of frame 3, the players ranked 6th or lower are eliminated at the end of frame 6, and the players ranked 4th or lower are eliminated at the end of frame 9. Therefore, at the end of each frame at which elimination determination is performed, it is determined whether each of the rankings of the other players is this ranking or lower. Then, on the basis of this result, the information of the other players who have been eliminated is registered in the watcher list.

Next, in step S124, the processor 21 determines whether the ranking of the player at that time point is a ranking that can pass the borderline (elimination determination for the player). As a result of the determination, if the ranking of the player is a ranking that can pass the borderline (YES in step S124), the processor 21 advances the processing to step S122. At this time, a representation indicating that the borderline is passed may be displayed. On the other hand, if the ranking of the player is not a ranking that can pass the borderline (NO in step S124), in step S125, the processor 21 performs a process for shifting the player to the watching mode. Specifically, the processor 21 registers the information of the player in the watcher list included in the progress management data 308 (that is, eliminates the player). Then, the processor 21 ends the frame-end-time process.

Figure 24:
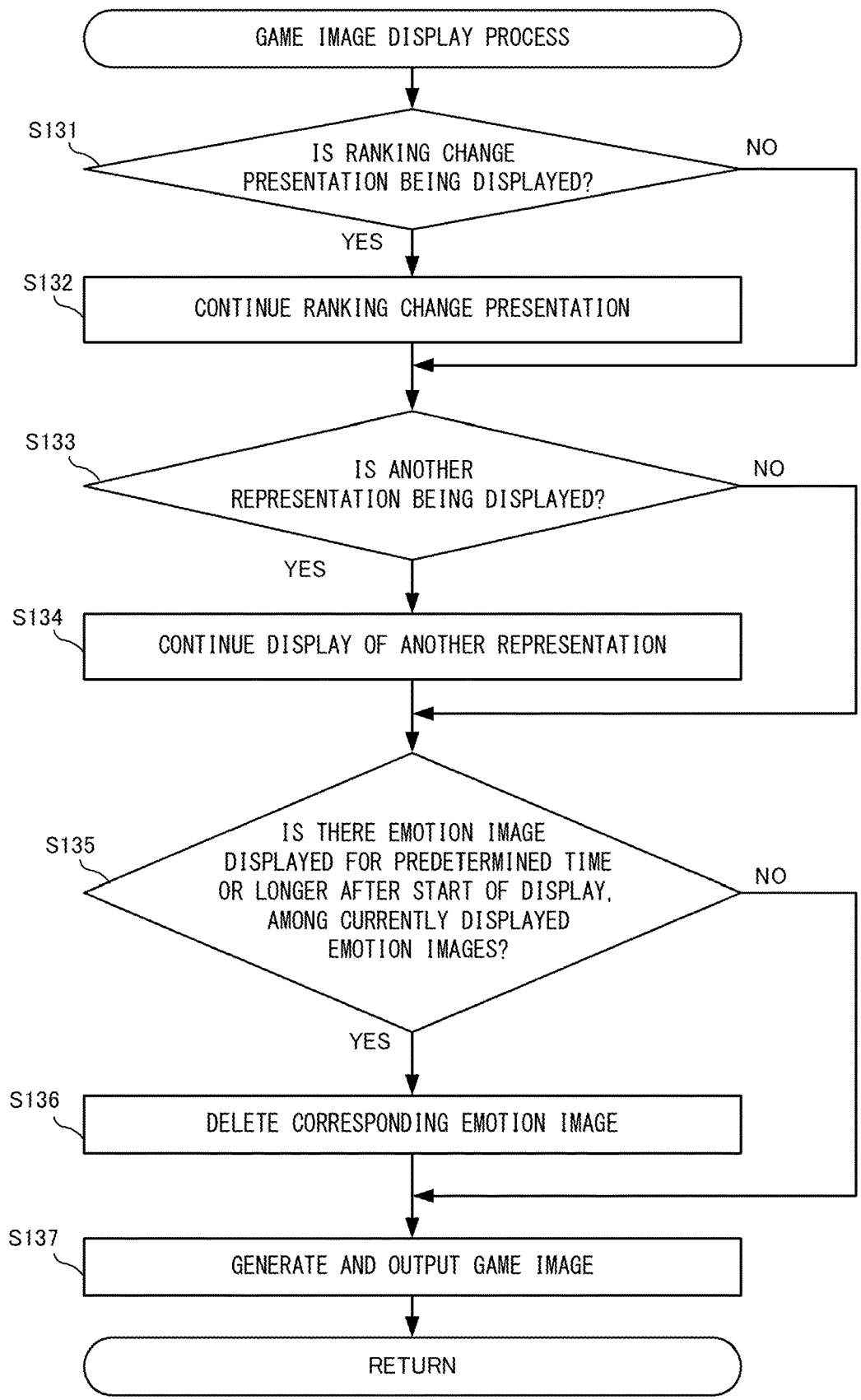
FIG. 24 is a non-limiting example flowchart showing the details of a game image display process.

Referring back to FIG. 13, next, in step S26, the processor 21 executes a game image display process. FIG. 24 is a flowchart showing the details of the game image display process. In FIG. 24, first, in step S131, the processor 21 determines whether the ranking change representation is being displayed in the ranking table 205 as shown in FIG. 3 to FIG. 5. That is, the processor 21 determines whether any of the player information objects 211 is being moved toward the display position corresponding to the ranking after change. As a result of the determination, if the ranking change representation is being displayed (YES in step S131), in step S132, the processor 21 performs control of continuing the display of the ranking change representation (continues the movement of the player information object 211 toward the above movement target point). On the other hand, if the ranking change representation is not being displayed (NO in step S131), the process in step S132 is skipped, and the processor 21 advances the processing to the next step.

Next, in step S133, the processor 21 determines whether a predetermined representation other than the ranking change representation is being displayed. Examples of the predetermined representation include a paly start representation for each frame, a second ball roll start representation, a representation at the end of each frame, a replay representation, etc. As a result of the determination, if the predetermined representation is being displayed (YES in step S133), in step S134, the processor 21 performs control of continuing the display of the representation. On the other hand, if the predetermined representation is not being displayed (NO in step S133), the process in step S134 is skipped, and the processor 21 advances the processing to the next step.

Next, in step S135, the processor 21 determines whether, among the currently displayed emotion images 212, there is an emotion image 212 that has been displayed for a predetermined time or longer after the display thereof is started. As a result of the determination, if there is such an emotion image (YES in step S135), in step S136, the processor 21 deletes this emotion image 212. On the other hand, if there is no such emotion image 212 (NO in step S135), the process in step S136 is skipped, and the processor 21 advances the processing to the next step.

Next, in step S137, the processor 21 generates a game image reflecting the various processes described above, and outputs the game image to the display unit 5. That is, the processor 21 takes an image of a virtual space reflecting the various processes described above, by the virtual camera. Furthermore, the processor 21 generates (an image of) the ranking table 205 reflecting the content of the ranking table update process and the display control content of the emotion image 212, and combines the image taken by the virtual camera, with the ranking table 205, thereby generating a game image. Then, the processor 21 outputs the game image to the display unit 5. Then, the processor 21 ends the game image display process.

Referring back to FIG. 13, when the game image display process is ended, the processor 21 ends the one-game control process.

Referring back to FIG. 11, when the one-game control process is ended, next, in step S3, the processor 21 determines whether one game (play for ten frames) has been ended, on the basis of the progress management data 308. As a result of the determination, if one game has not been ended (NO in step S3), the processor 21 returns to step S2 and repeats the process. If one game has been ended (YES in step S3), in step S4, the processor 21 executes an end-time process. In this process, a process of displaying a representation for announcing final rankings based on the total scores is executed. In addition, various processes for ending the bowling game (for example, disconnecting the game apparatuses 2 from each other) are also performed as appropriate. Then, the bowling game processing is ended.

This is the end of the detailed description of the bowling game processing according to the exemplary embodiment.

As described above, in the exemplary embodiment, in a sports game, such as bowling, in which play itself is completed by a single player, how the ranking table 205 changes in real time is displayed. Accordingly, an experience of playing while being aware of the presence of opponents, rather than an experience of playing like playing alone, can be provided. In addition, the player is allowed to grasp the overall situation of the game. Accordingly, it is possible to improve the entertainment characteristics of the multi-player competitive game such as bowling.

Moreover, by displaying the above emotion image 212 as appropriate, the player is allowed to guess the situation of the opponent. For example, the player information object 211 with the emotion image 212 easily attracts a player's attention. Then, for example, if a smile emotion image 212 is displayed to indicate that a strike has been achieved at the player information object 211, the player can guess that the other player who has displayed the emotion image 212 is pleased to have achieved a strike. By enabling such guess, it is possible to make the player aware of the presence of the opponents, and stimulate the player's competitive spirit, so that it is possible to improve the entertainment characteristics of the game.

Modifications

In the above embodiment, a bowling game has been exemplified as the multi-player competitive game. In addition, for example, the above processing can also be applied to sports games, such as a golf game, in which the progress of play itself can be managed and completed by only one player and the final ranking is determined by the final total score.

In the above embodiment, the example of including the total score at that time point in the data to be transmitted to the other game apparatuses 2 has been described. However, in another exemplary embodiment, only the number of pins knocked down and the play state result (information such as strike) may be transmitted without transmitting the total score. Then, each game apparatus 2 that has received this information may calculate the total score of each player. In addition, in still another exemplary embodiment, only the total score may be transmitted to the other game apparatuses 2. In this case, for example, the content of the lane representation for the other player may be set as appropriate on the basis of the total score. That is, instead of reproducing the actual movement for the other player, movement similar to this may be made on the basis of the total score.

In the above embodiment, the example of reflecting the ranking change of the player in the ranking table 205 each time one-unit play is completed has been described. In another exemplary embodiment, such reflection in the ranking table 205 may be performed at the timing when one-set play is completed. In this case as well, the content of the ranking table 205 can be changed as soon as one-set play of each player is completed, without waiting for all participating players to complete one-set play.

In the above embodiment, the example of performing the change representation of the ranking table 205 for each player has been described. In another exemplary embodiment, the ranking change representation may be performed at once for a plurality of players.

In the above embodiment, the example of controlling the progress in a manner of waiting for another player to complete play after one-set play is completed, has been described. In another exemplary embodiment, until a frame at which elimination determination is performed (in this example, frame 3, frame 6, frame 9) is completed, the game of each player may be able to proceed without waiting as described above. That is, completion of play by the other players may be waited for only when play at a frame at which elimination determination is performed is completed. In addition, in another exemplary embodiment, completion of play by the other players may be waited for every one-unit play.

Moreover, as for the display of the emotion image 212, at the timing when the emotion image 212 is displayed according to an instruction by another player, the bowler character 204 corresponding to the other player may be caused to perform a predetermined action. For example, when another player makes an instruction to display an emotion image in which a fist is raised, the bowler character 204 corresponding to the other player may be caused to perform an action of raising a fist. Accordingly, when the bowler character 204 performing such an action is included in the field of view of the virtual camera (for example, when the bowler character 204 is playing on an adjacent lane), it can be easier to visually grasp the situation change of the other player.

In the above embodiment, the case where the series of game processing is performed in the single game apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having stored therein a game program causing a computer of an information processing apparatus to execute a multi-player competitive video game, the game program comprising instructions that are configured to cause the computer to perform operations comprising:
   executing the multi-player competitive video game;
   generating images, via a virtual camera, of a virtual game space of the multi-player competitive video game, the virtual game space including multiple virtual objects and representations of players of the multi-player competitive video game;
   as part of the multi-player competitive video game, performing a plurality of play sets;
   for each corresponding play set of the plurality of play sets that is performed:
      controlling, based on received operation input, at least one of the multiple virtual objects that is located within the virtual game space;
      based on how the at least one of the multiple virtual objects has been controlled, perform local score calculation including calculating 1) a score based on a play result for the corresponding play set, and 2) a total score that is based on the calculated score for the corresponding play set and previously calculated scores from previously completed play sets of the plurality of play sets;
   receiving score updates for other players participating in the multi-player competitive video game, the score updates including individual play results and/or total score updates for the other players for each of the other ones of the players;
   based on reception of score updates and/or performance of the local score calculation, updating a player information display that is displayed as part of the multi-player competitive video game, wherein updates are performed regardless of whether all players have completed a play set of the plurality of play sets, such that the player information display is displayed in a display order corresponding to rankings based on the total score for each player; and
   display final rankings based on the total scores after completion of the plurality of play sets by all the players of the multi-player competitive video game.

2. The computer-readable non-transitory storage medium according to claim 1, wherein the multi-player competitive video game is played while communication is being performed with a plurality of other information processing apparatuses, and
   the operations further comprising:
      transmitting at least the score corresponding to the play result for each play or the total score for each play, to the other information processing apparatuses, and
      receiving at least the score corresponding to the play result for each play or the total score for each play of another player from each of the other information processing apparatuses.

3. The computer-readable non-transitory storage medium according to claim 2, the operations further comprising:
   during play of the multi-player competitive video game, making an image display instruction to display a predetermined image at a display position of the player information display regarding a player, based on an operation input by the player, and transmit information indicating that the image display instruction has been made, to the other information processing apparatuses, and displaying the player information display regarding each player such that the predetermined image is placed at the display position of the player information display regarding the player in accordance with the image display instruction being made, and when information indicating that the image display instruction has been made is received from another information processing apparatus, the predetermined image is placed at a display position of the player information display regarding a player of a corresponding information processing apparatus.

4. The computer-readable non-transitory storage medium according to claim 3, the operations further comprising:
during play of the multi-player competitive video game, making the image display instruction based on an operation input by the player in a period in which the play in each set is not performed.

5. The computer-readable non-transitory storage medium according to claim 1, wherein the player information display includes at least information for identifying the player and the total score.

6. The computer-readable non-transitory storage medium according to claim 5, wherein the player information display further includes at least a play result of a set played immediately before.

7. The computer-readable non-transitory storage medium according to claim 1, wherein the multi-player competitive video game is a bowling game.

8. The storage medium according to claim 7, the operations further comprising: generating a game image including at least a player character to be operated based on an operation input by the player, a lane on which the player character rolls a ball, and player information regarding each player.

9. The computer-readable non-transitory storage medium according to claim 8, the operations further comprising: generating a game image further including at least one opponent player character to be operated based on an operation input by another player and at least one opponent lane on which the opponent player character rolls a ball.

10. A game apparatus comprising:
a computer that includes at least one hardware process that is configured to perform operations comprising:
executing a multi-player competitive video game;
generating images, via a virtual camera, of a virtual game space of the multi-player competitive video game, the virtual game space including multiple virtual objects and representations of players of the multi-player competitive video game;
as part of the multi-player competitive video game, performing a plurality of play sets;
for each corresponding play set of the plurality of play sets that is performed:
controlling, based on received operation input, at least one of the multiple virtual objects that is located within the virtual game space;
based on how the at least one of the multiple virtual objects has been controlled, perform local score calculation including calculating 1) a score based on a play result for the corresponding play set, and 2) a total score that is based on the calculated score for the corresponding play set and previously calculated scores from previously completed play sets of the plurality of play sets;
receiving score updates for other players participating in the multi-player competitive video game, the score updates including individual play results and/or total score updates for the other players for each of the other ones of the players;
based on reception of score updates and/or performance of the local score calculation, updating a player information display that is displayed as part of the multi-player competitive video game, wherein updates are performed regardless of whether all players have completed a play set of the plurality of play sets, such that the player information is displayed in a display order corresponding to rankings based on the total score for each player; and
displaying final rankings on the basis of the total scores after completion of the plurality of play sets by all the players of the multi-player competitive video game.

11. The game apparatus according to claim 10, wherein the multi-player competitive video game is played while communication is being performed with a plurality of other information processing apparatuses, and
the operations further comprising:
transmitting at least the score corresponding to the play result for each play or the total score for each play, to the other information processing apparatuses, and
receiving at least the score corresponding to the play result for each play or the total score for each play of another player from each of the other information processing apparatuses.

12. The game apparatus according to claim 11, the operations further comprising:
during play of the multi-player competitive video game, making an image display instruction to display a predetermined image at a display position of the player information display regarding a player, based on an operation input by the player, and transmit information indicating that the image display instruction has been made, to the other information processing apparatuses, and
displaying the player information display regarding each player such that the predetermined image is placed at the display position of the player information display regarding the player in accordance with the image display instruction being made, and when information indicating that the image display instruction has been made is received from another information processing apparatus, the predetermined image is placed at a display position of the player information display regarding a player of a corresponding information processing apparatus.

13. The game apparatus according to claim 12, the operations further comprising:
during play of the multi-player competitive video game, making the image display instruction based on an operation input by the player in a period in which the play in each set is not performed.

14. The game apparatus according to claim 10, wherein the player information includes at least information for identifying the player and the total score.

15. The game apparatus according to claim 14, wherein the player information further includes at least a play result of a set played immediately before.

16. The game apparatus according to claim 10, wherein the competitive game is a bowling game.

17. The game apparatus according to claim 16, the operations further comprising: generating a game image including at least a player character to be operated based on an operation input by the player, a lane on which the player character rolls a ball, and player information regarding each player.

18. The game apparatus according to claim 17, the operations further comprising: generating a game image further including at least one opponent player character to be operated based on an operation input by another player and at least one opponent lane on which the opponent player character rolls a ball.

19. A game system comprising a game apparatus including a computer, the game system executing a multi-player competitive video game which is played while communication is being performed with a plurality of other game apparatuses and in which a ranking of a player is determined by a total score based on a play result of a specified number of sets of play by the player, wherein the computer at least one hardware processor of the computer configured to perform operations comprising:
executing the multi-player competitive video game;
generating images, via a virtual camera, of a virtual game space of the multi-player competitive video game, the virtual game space including multiple virtual objects and representations of players of the multi-player competitive video game;
as part of the multi-player competitive video game, performing a plurality of play sets;
for each corresponding play set of the plurality of play sets that is performed:
controlling, based on received operation input, at least one of the multiple virtual objects that is located within the virtual game space;
based on how the at least one of the multiple virtual objects has been controlled, perform local score calculation including calculating 1) a score based on a play result for the corresponding play set, and 2) a total score that is based on the calculated score for the corresponding play set and previously calculated scores from previously completed play sets of the plurality of play sets;
transmitting, to the other information processing apparatuses, at least the score corresponding to the play result for each play or the total score for each play;
receiving score updates for other players participating in the multi-player competitive video game, the score updates including individual play results and/or total score updates for the other players for each of the other ones of the players;
based on reception of score updates and/or performance of the local score calculation, updating a player information display that is displayed as part of the multi-player competitive video game, wherein updates are performed regardless of whether all players have completed a play set of the plurality of play sets, such that the player information display is displayed in a display order corresponding to rankings based on the total score for each player; and
display final rankings based on the total scores after completion of the plurality of play sets by all the players of the multi-player competitive video game.

20. The game system according to claim 19, the operations further comprising:
during play of the multi-player competitive video game, making an image display instruction to display a predetermined image at a display position of the player information display regarding a player, based on an operation input by the player, and transmit information indicating that the image display instruction has been made, to the other information processing apparatuses, and
displaying the player information display regarding each player such that the predetermined image is placed at the display position of the player information display regarding the player in accordance with the image display instruction being made, and when information indicating that the image display instruction has been made is received from another information processing apparatus, the predetermined image is placed at a display position of the player information display regarding a player of a corresponding information processing apparatus.

21. The game system according to claim 20, the operations further comprising:
during play of the multi-player competitive video game, making the image display instruction based on an operation input by the player in a period in which the play in each set is not performed.

22. The game system according to claim 19, wherein the player information includes at least information for identifying the player and the total score.

23. The game system according to claim 22, wherein the player information further includes at least a play result of a set played immediately before.

24. The game system according to claim 19, wherein the competitive game is a bowling game.

25. The game system according to claim 24, the operations further comprising: generating a game image including at least a player character to be operated based on an operation input by the player, a lane on which the player character rolls a ball, and player information regarding each player.

26. The game system according to claim 25, the operations further comprising: generating a game image further including at least one opponent player character to be operated based on an operation input by another player and at least one opponent lane on which the opponent player character rolls a ball.

27. A game processing method for performing a multi-player competitive game, the game processing method comprising:
executing, on a computer, the multi-player competitive video game;
generating images, via a virtual camera, of a virtual game space of the multi-player competitive video game, the virtual game space including multiple virtual objects and representations of players of the multi-player competitive video game;
as part of the multi-player competitive video game, performing a plurality of play sets;
for each corresponding play set of the plurality of play sets that is performed:
controlling, based on received operation input, at least one of the multiple virtual objects that is located within the virtual game space;
based on how the at least one of the multiple virtual objects has been controlled, perform local score calculation including calculating 1) a score based on a play result for the corresponding play set, and 2) a total score that is based on the calculated score for the corresponding play set and previously calculated scores from previously completed play sets of the plurality of play sets;
receiving score updates for other players participating in the multi-player competitive video game, the score updates including individual play results and/or total score updates for the other players for each of the other ones of the players;

based on reception of score updates and/or performance of the local score calculation, updating a player information display that is displayed as part of the multi-player competitive video game, wherein updates are performed regardless of whether all players have completed a play set of the plurality of play sets, such that the player information display is displayed in a display order corresponding to rankings based on the total score for each player; and display final rankings based on the total scores after completion of the plurality of play sets by all the players of the multi-player competitive video game.

28. The game processing method according to claim 27, wherein wherein the multi-player competitive video game is played while communication is being performed with a plurality of other information processing apparatuses, and the method further comprising:

transmitting at least the score corresponding to the play result for each play or the total score for each play, to the other information processing apparatuses, and receiving at least the score corresponding to the play result for each play or the total score for each play of another player from each of the other information processing apparatuses.

29. The game processing method according to claim 28, further comprising:

during play of the multi-player competitive video game, making an image display instruction to display a predetermined image at a display position of the player information display regarding a player, based on an operation input by the player, and transmit information indicating that the image display instruction has been made, to the other information processing apparatuses, and displaying the player information display regarding each player such that the predetermined image is placed at the display position of the player information display regarding the player in accordance with the image display instruction being made, and when information indicating that the image display instruction has been made is received from another information processing apparatus, the predetermined image is placed at a display position of the player information display regarding a player of a corresponding information processing apparatus.

30. The game processing method according to claim 29, further comprising:

during play of the multi-player competitive video game, making the image display instruction based on an operation input by the player in a period in which the play in each set is not performed.

31. The game processing method according to claim 27, wherein the player information includes at least information for identifying the player and the total score.

32. The game processing method according to claim 31, wherein the player information further includes at least a play result of a set played immediately before.

33. The game processing method according to claim 27, wherein the competitive game is a bowling game.

34. The game processing method according to claim 33, further comprising: generating a game image including at least a player character to be operated based on an operation input by the player, a lane on which the player character rolls a ball, and player information regarding each player.

35. The game processing method according to claim 34, further comprising:

generating a game image further including at least one opponent player character to be operated based on an operation input by another player and at least one opponent lane on which the opponent player character rolls a ball.

* * * * *